(12) United States Patent
Nakamura

(10) Patent No.: US 12,529,572 B2
(45) Date of Patent: Jan. 20, 2026

(54) DISPLAY DEVICE, SERVER AND METHOD

(71) Applicant: TOYOTA JIDOSHA KABUSHIKI KAISHA, Toyota (JP)

(72) Inventor: Tohru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 18/486,432

(22) Filed: Oct. 13, 2023

(65) Prior Publication Data

US 2024/0174084 A1 May 30, 2024

(30) Foreign Application Priority Data

Nov. 25, 2022 (JP) ................................ 2022-188360

(51) Int. Cl.
*G01C 21/36* (2006.01)
*B60K 35/00* (2024.01)
*B60K 35/29* (2024.01)
*B60L 53/64* (2019.01)
*B60L 53/66* (2019.01)
*B60L 58/12* (2019.01)

(52) U.S. Cl.
CPC .......... *G01C 21/3682* (2013.01); *B60K 35/00* (2013.01); *B60L 53/64* (2019.02); *B60L 53/665* (2019.02); *B60L 58/12* (2019.02); *B60K 35/29* (2024.01); *B60K 2360/186* (2024.01); *B60L 2240/72* (2013.01); *B60L 2260/54* (2013.01)

(58) Field of Classification Search
CPC ............ G01C 21/3682; G01C 21/3811; B60K 35/00; B60K 35/29; B60K 2360/186; B60L 53/665; B60L 2240/72; B60L 2260/54; B60L 53/67; B60L 2240/62; B60L 2250/16; B60L 2260/52; B60L 53/305; B60L 53/64; B60L 53/68; B60L 58/12; B60L 3/12; B60L 53/66; G06F 3/1407; G06Q 50/40; G06Q 50/10; H04W 4/02; H04W 4/40; B60Y 2200/91; Y02T 10/64; Y02T 90/10
See application file for complete search history.

(56) References Cited

U.S. PATENT DOCUMENTS

| 2012/0109409 A1 | 5/2012 | Hara |
| 2017/0299401 A1 | 10/2017 | Choi et al. |
| 2018/0158150 A1* | 6/2018 | Li .......................... G07F 15/005 |

(Continued)

FOREIGN PATENT DOCUMENTS

| JP | 2008-165652 A | 7/2008 |
| JP | 2009-008609 A | 1/2009 |

(Continued)

*Primary Examiner* — Michael J Zanelli
(74) *Attorney, Agent, or Firm* — Oliff PLC

(57) ABSTRACT

A mobile terminal includes a display and a controller. The display displays a map image. The controller controls the display. The controller controls the display to, when a placement position of at least one power facility is displayed on the map image, display power-rate-related information and the placement position of the at least one power facility on the map image. The at least one power facility supplies electric power to an object having a power storage device mounted thereon, to charge the power storage device. The power-rate-related information is information related to a power rate unit price for charging.

14 Claims, 16 Drawing Sheets

(56) References Cited

U.S. PATENT DOCUMENTS

| | | |
|---|---|---|
| 2019/0139162 A1 | 5/2019 | Sawada et al. |
| 2021/0046843 A1* | 2/2021 | Maeda et al. |
| 2023/0028206 A1* | 1/2023 | Quint .................... B60L 53/305 |
| 2024/0140239 A1* | 5/2024 | Anand .................. B60L 53/305 |

FOREIGN PATENT DOCUMENTS

| | | |
|---|---|---|
| JP | 2011-174711 A | 9/2011 |
| JP | 2012-73272 A | 4/2012 |
| JP | 2012-108870 A | 6/2012 |
| JP | 2013-051875 A | 3/2013 |
| JP | 2013-104680 A | 5/2013 |
| JP | 2014-056589 A | 3/2014 |
| JP | 5500634 B2 * | 5/2014 |
| JP | 2019-087142 A | 6/2019 |
| JP | 2021-009108 A | 1/2021 |
| KR | 10-2012-0073674 A | 7/2012 |
| KR | 10-2017-0059676 A | 5/2017 |
| KR | 10-2017-0119536 A | 10/2017 |

* cited by examiner

FIG.5

| POWER FACILITY ID 205 | POWER RATE SYSTEM 210 | POWER RATE UNIT PRICE 215 | PLACEMENT POSITION (X,Y,Z) 220 |
|---|---|---|---|
| ST001 206A | NORMAL 211A | UP1 (CONSTANT) 216A | X1, Y1, Z1 221A |
| ST002 206B | DYNAMIC PRICING 211B | UP2 (TIME-DEPENDENT) 216B | X2, Y2, Z2 221B |
| ST003 206C | DYNAMIC PRICING 211C | UP3 (TIME-DEPENDENT) 216C | X3, Y3, Z3 221C |
| ST004 206D | DYNAMIC PRICING 211D | UP4 (TIME-DEPENDENT) 216D | X4, Y4, Z4 221D |
| ST005 206E | DYNAMIC PRICING 211E | UP5 (TIME-DEPENDENT) 216E | X5, Y5, Z5 221E |
| ... | ... | ... | ... |

FIG.6

| VEHICLE ID 405 | ELECTRIC MILEAGE [km/kWh] 410 | SOC[%] 415 | CURRENT POSITION 420 |
|---|---|---|---|
| V001 406 | em1 411 | SOC1 416 | x1, y1, z1 421 |
| V002 | em2 | SOC2 | x2, y2, z2 |
| V003 | em3 | SOC3 | x3, y3, z3 |
| V004 | em4 | SOC4 | x4, y4, z4 |
| V005 | em5 | SOC5 | x5, y5, z5 |
| ... | ... | ... | ... |

DISPLAY DEVICE, SERVER AND METHOD

CROSS REFERENCE TO RELATED APPLICATIONS

This nonprovisional application is based on Japanese Patent Application No. 2022-188360 filed on Nov. 25, 2022 with the Japan Patent Office, the entire contents of which are hereby incorporated by reference.

BACKGROUND

Field

The present disclosure relates to a display device, a server and a method.

Description of the Background Art

Japanese Patent Laying-Open No. 2013-104680 discloses a charging station display system. The system includes a battery electric vehicle, a plurality of charging stations, and a display terminal. Each of the charging stations is placed outside the battery electric vehicle and is used to charge a battery of the battery electric vehicle. The display terminal displays, on a map image of the battery electric vehicle and its surroundings, a position of a charging station at which the battery electric vehicle can arrive.

SUMMARY

A power facility that can supply electric power to an object having a power storage device mounted thereon, such as a battery electric vehicle, to charge the power storage device has become widespread. When a power storage device is charged using a power facility, a power rate is required. It is important for a user of the power facility to recognize how much the power rate required to charge the power storage device is. The inability of the user to recognize information related to the power rate in advance, and the difficulty of the user to recognize such information are undesirable.

The present disclosure has been made in light of the above-described problem, and an object thereof is to provide a display device, a server and a method that allow a user to easily recognize, in advance, information related to a power rate required to charge a power storage device using a power facility.

A display device of the present disclosure includes: a display; and a controller. The display displays a map image. The controller controls the display. The controller controls the display to, when a placement position of at least one power facility is displayed on the map image, display power-rate-related information and the placement position of the at least one power facility on the map image. The at least one power facility supplies electric power to an object having a power storage device mounted thereon, to charge the power storage device. The power-rate-related information is information related to a power rate unit price for charging.

With the above-described configuration, for each power facility, the power-rate-related information is displayed on the map image, together with the placement position. Thus, a user can easily recognize the power-rate-related information and the placement position for each power facility in advance.

A server of the present disclosure communicates with a display device that displays a placement position of at least one power facility on a map image. The at least one power facility supplies electric power to an object having a power storage device mounted thereon, to charge the power storage device. The server includes: a communication device; and a processor. The communication device obtains information indicating a power rate unit price of the at least one power facility and information indicating the placement position of the at least one power facility. The processor sets power-rate-related information of the at least one power facility in accordance with the power rate unit price. The power-rate-related information is information related to the power rate unit price. The communication device transmits the power-rate-related information to the display device.

A method of the present disclosure is used to control a display device that displays a map image. The method includes: obtaining information indicating a power rate unit price of at least one power facility; and controlling the display device to display power-rate-related information and a placement position of the at least one power facility on the map image. The at least one power facility supplies electric power to an object having a power storage device mounted thereon, to charge the power storage device. The power-rate-related information is information related to the power rate unit price.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 illustrates a data structure of a facility DB.

FIG. 6 illustrates a data structure of a vehicle DB.

DESCRIPTION OF THE PREFERRED EMBODIMENTS

Figure 1:
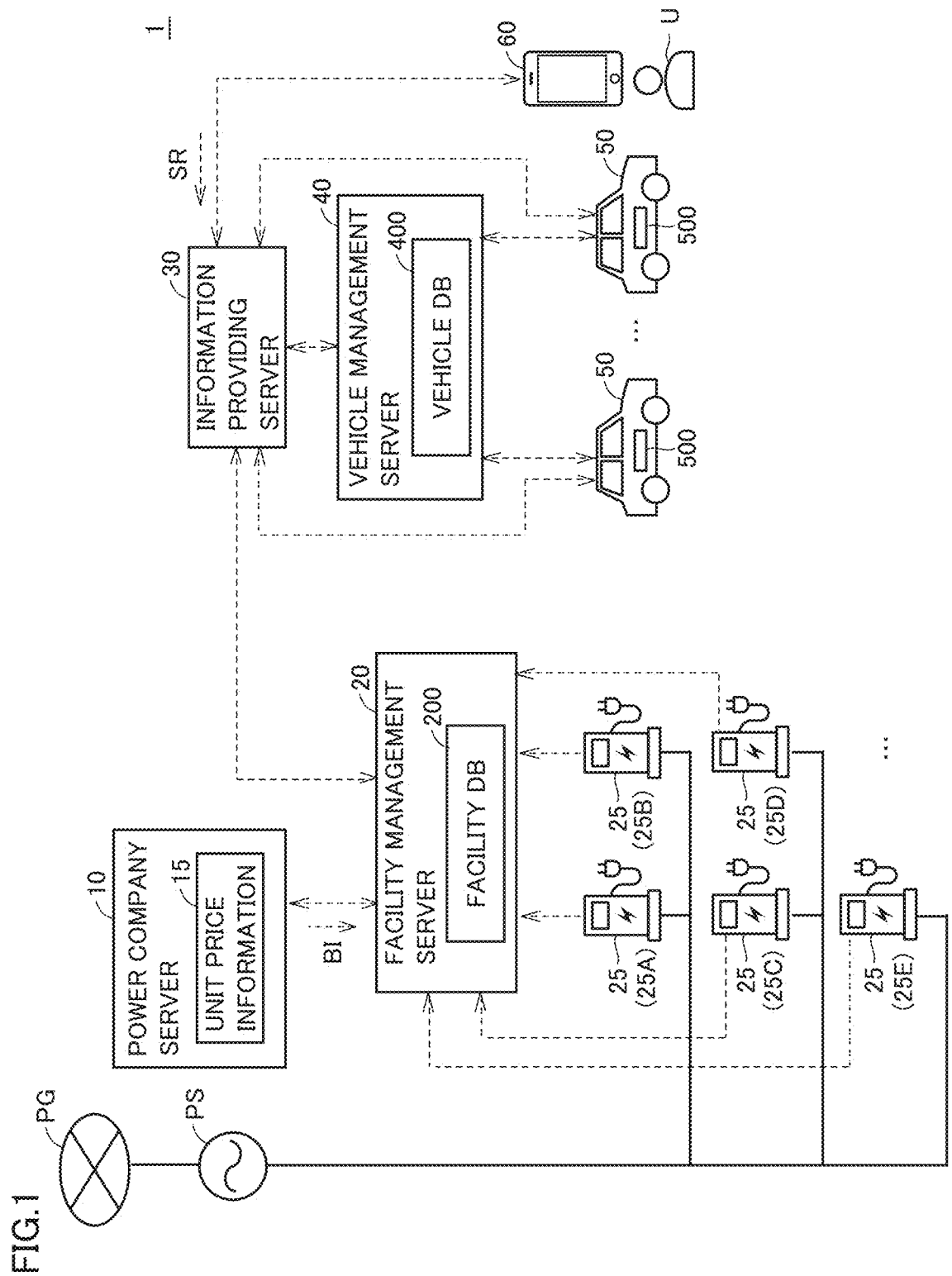
FIG. 1 schematically shows a configuration of a power processing system according to a first embodiment.

Embodiments of the present disclosure will be described in detail hereinafter with reference to the drawings, in which the same or corresponding portions are denoted by the same reference characters and description thereof will not be repeated.

First Embodiment

FIG. 1 schematically shows a configuration of a power processing system according to a first embodiment. Referring to FIG. 1, a power processing system 1 includes a power company server 10, a facility management server 20, a plurality of power facilities 25, an information providing server 30, a vehicle management server 40, a plurality of vehicles 50, and a mobile terminal 60.

Power company server 10 stores unit price information 15. Unit price information 15 indicates a power rate unit price of a commercial power supply PS. The power rate unit price varies with time. Power company server 10 manages a power supply and demand balance situation in a power grid PG. The situation indicates to what extent a power demand is higher or lower than a power supply in power grid PG.

Facility management server 20 communicates with power company server 10 and each power facility 25, and manages each power facility 25. Facility management server 20 obtains, from power company server 10, balance information BI indicating the power supply and demand balance situation. Facility management server 20 stores a facility database (DB) 200 indicating various types of information about each power facility 25. Facility DB 200 will be described in detail later.

Each power facility 25 supplies electric power to an object having a power storage device mounted thereon, to charge the power storage device. Although the object may be a stationary object, the object is a movable object that moves by consuming electric power of the power storage device, and is, for example, vehicle 50 in the first embodiment. The plurality of power facilities 25 include power facilities 25A to 25E. Each of power facilities 25A to 25E is located in an area (nearby area) around a current position of a user U. The nearby area is determined as an area within a prescribed distance (e.g., 1 km) from the current position of user U.

A power rate unit price of power facility 25 is a unit price of electric power supplied from power facility 25 to the object, and corresponds to a power rate unit price for external charging (described below). A power rate unit price of power facility 25A is irrelevant to the power rate unit price of commercial power supply PS and is constant in time. Power facility 25 whose power rate unit price is constant in time, such as power facility 25A, is also referred to as "normal facility" for the sake of convenience. In contrast, a power rate unit price of each of power facilities 25B to 25E is dependent on the power rate unit price of commercial power supply PS and varies temporally. Power facility 25 whose power rate unit price varies temporally, such as each of power facilities 25B to 25E, is also referred to as "dynamic pricing (DP) facility" for the sake of convenience. Dynamic pricing for a power rate is a method for changing a power rate unit price in accordance with a supply and demand balance in power grid PG. The power rate unit price of the DP facility may vary in real time. The DP facility corresponds to "first facility" in the present disclosure. The normal facility corresponds to "second facility" in the present disclosure.

Information providing server 30 communicates with each of facility management server 20, vehicle management server 40, vehicles 50, and mobile terminal 60. Information providing server 30 performs a process for providing various types of information about power facilities 25 (e.g., information indicating placement positions of power facilities 25) to user U of mobile terminal 60 through screen display. This process is also referred to as "information providing process". Hereinafter, information providing server 30 is also simply referred to as "server 30".

Vehicle management server 40 communicates with each vehicle 50 and manages each vehicle 50. Vehicle management server 40 stores a vehicle database (DB) 400 indicating various types of information about each vehicle 50. Vehicle DB 400 will be described in detail later.

Each vehicle 50 has a power storage device 500 mounted thereon, and performs external charging in which power storage device 500 is charged using power facility 25. Vehicle 50 is one example of a movable object that can perform external charging.

Mobile terminal 60 is used to search for power facilities 25 in an area interested by user U of vehicle 50, of the plurality of power facilities 25. The area interested by user U is determined by a user operation performed on mobile terminal 60, and is the above-described nearby area in this example. In response to a user operation that provides an instruction to search for power facilities 25 in the nearby area, mobile terminal 60 transmits a search request SR to server 30. Search request SR includes a user ID of user U and position information of user U. The user ID is preliminarily associated with ID information (described below) of vehicle 50 owned by user U. In response to the reception of search request SR, server 30 performs the information providing process about power facilities 25 in the nearby area. Mobile terminal 60 corresponds to one example of "display device" in the present disclosure.

Figure 2:
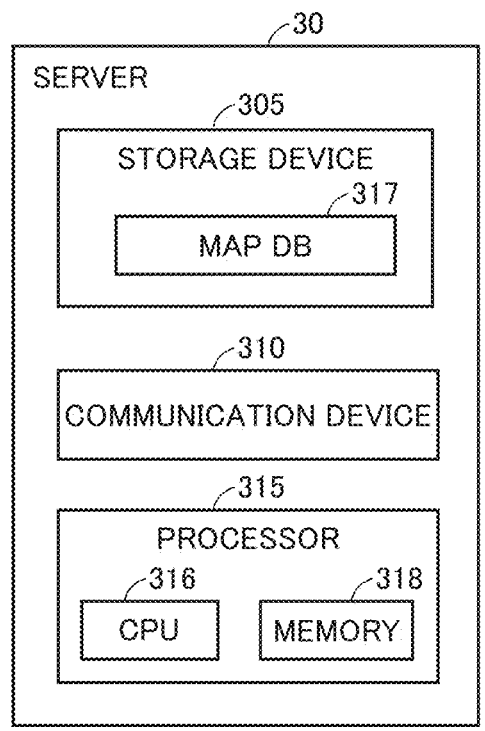
FIG. 2 shows a configuration of a server in detail.

FIG. 2 shows a configuration of server 30 in detail. Referring to FIG. 2, server 30 includes a storage device 305, a communication device 310 and a processor 315.

Storage device 305 stores various types of data (e.g., a map DB 317) used by processor 315. Communication device 310 communicates with an external device of server 30, such as facility management server 20, vehicle management server 40 or vehicle 50. Communication device 310 can obtain, by communication, various types of information of facility DB 200 and various types of information of vehicle DB 400 from facility management server 20 and vehicle management server 40, respectively.

Processor 315 includes a central processing unit (CPU) 316 and a memory 318. CPU 316 performs various types of operation processing. Memory 318 includes a read only memory (ROM) and a random access memory (RAM) (both are not shown). Processor 315 performs the information providing process about power facilities 25 in accordance with the data stored in storage device 305 and the information obtained by communication device 310.

Figure 3:
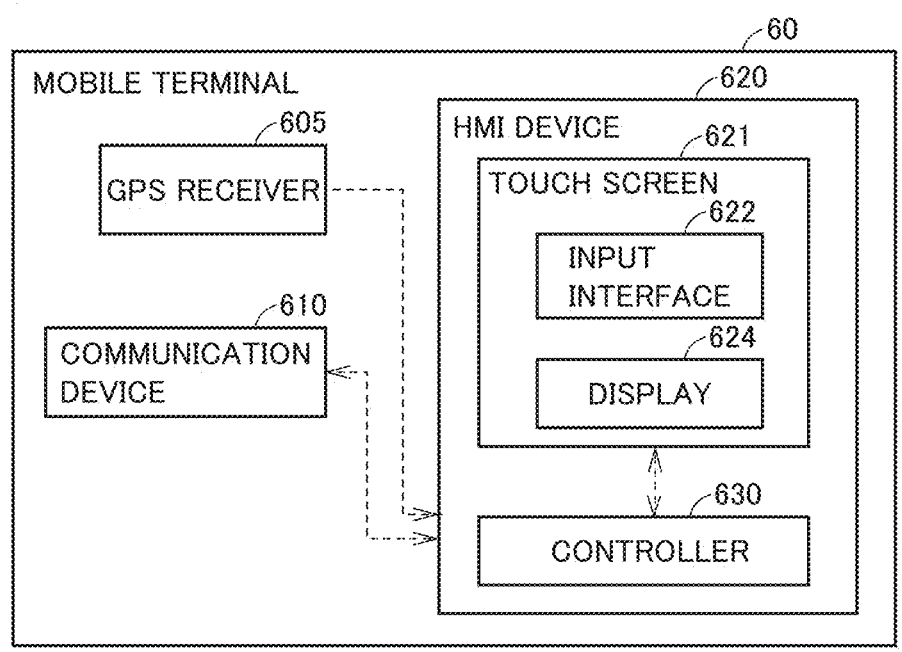
FIG. 3 shows a configuration of a mobile terminal in detail.

FIG. 3 shows a configuration of mobile terminal 60 in detail. Referring to FIG. 3, mobile terminal 60 includes a global positioning system (GPS) receiver 605, a communication device 610 and a human machine interface (HMI) device 620.

GPS receiver 605 obtains position information of mobile terminal 60 based on a radio wave from an artificial satellite.

Communication device 610 communicates with an external device of mobile terminal 60, such as server 30. For example, communication device 610 transmits the position information of mobile terminal 60 to server 30. Communication device 610 can also perform short-range communication. HMI device 620 includes a touch screen 621 and a controller 630.

Touch screen 621 includes an input interface 622 and a display 624. Input interface 622 receives an input of operation by user U (user operation). Display 624 displays various screens such as a screen including a map image, and displays the position information of mobile terminal 60 on the map image. Display 624 can also display a placement position of at least one power facility 25 on the map image. Controller 630 controls display 624 in accordance with the user operation performed on input interface 622.

Figure 4:
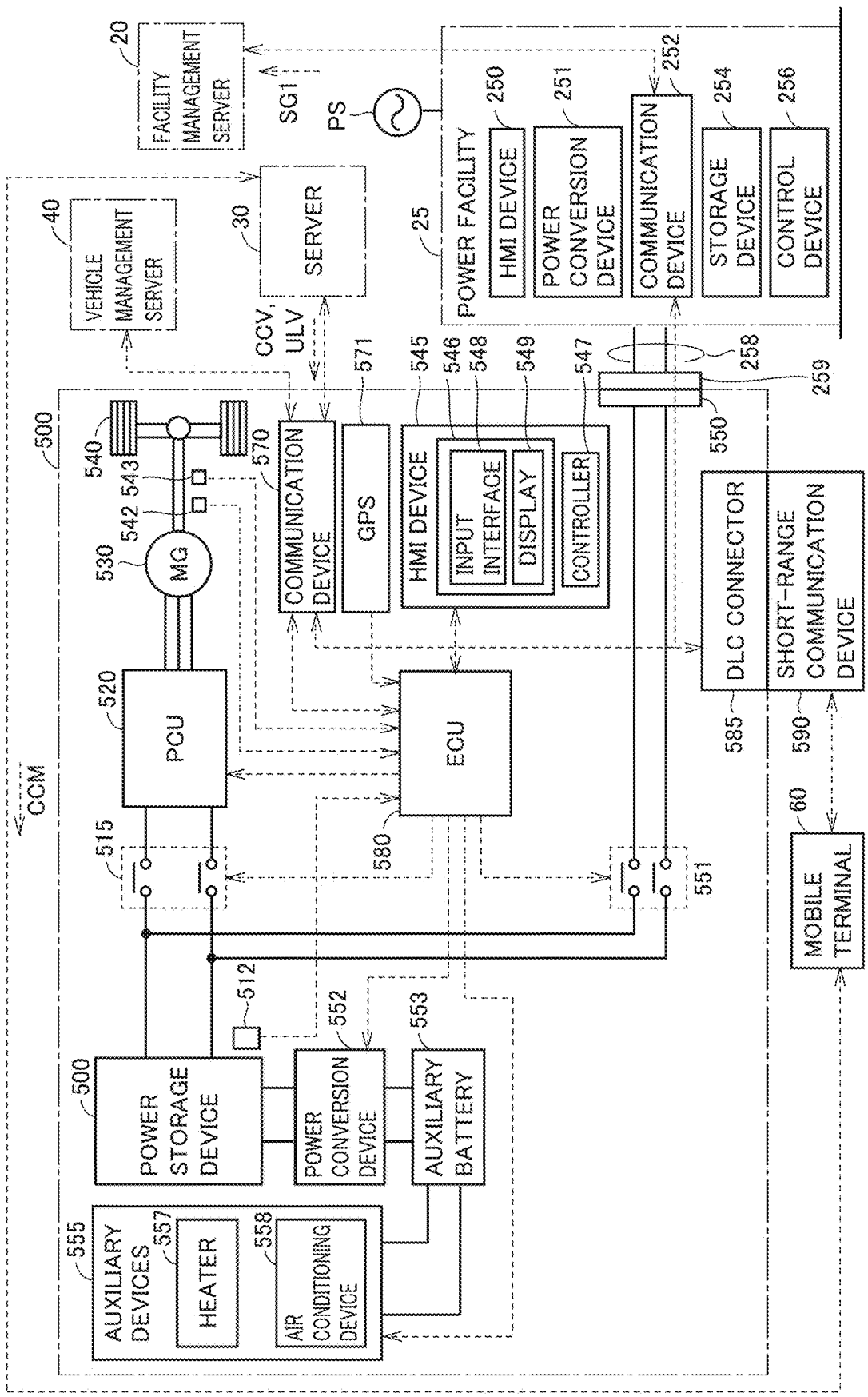
FIG. 4 shows configurations of a vehicle and a power facility in detail.

FIG. 4 shows configurations of vehicle 50 and power facility 25 in detail. In this example, user U is located in a compartment of vehicle 50 and mobile terminal 60 is carried by user U.

Referring to FIG. 4, vehicle 50 includes power storage device 500, a sensor unit 512, a system main relay (SMR) 515, a power control unit (PCU) 520, a motor generator (MG) 530, a driving wheel 540, a vehicle speed sensor 542, and an acceleration sensor 543. Vehicle 50 further includes an inlet 550, a charging relay 551, a communication device 570, a GPS receiver 571, an HMI device 545, a power conversion device 552, an auxiliary battery 553, auxiliary devices 555, a DLC connector 585, and an electronic control unit (ECU) 580.

Power storage device 500 is a secondary battery such as a lithium ion battery. An amount of electric power stored in power storage device 500 is indicated by a state of charge (SOC). Sensor unit 512 includes a voltage sensor, a current sensor and a temperature sensor that detect a voltage, a current and a temperature of power storage device 500, respectively (all are not shown). SMR 515 is provided between power storage device 500 and PCU 520. SMR 515 is turned on during running of vehicle 50.

PCU 520 includes a converter and an inverter (both are not shown). PCU 520 converts DC power received from power storage device 500 into AC power. MG 530 receives the AC power converted by PCU 520 and generates rotational driving force. The driving force generated by MG 530 is transmitted to driving wheel 540. As a result, vehicle 50 runs. Vehicle speed sensor 542 and acceleration sensor 543 detects a running speed (vehicle speed) and an acceleration of vehicle 50, respectively.

Inlet 550 receives electric power supplied from commercial power supply PS through power facility 25. Inlet 550 is used for external charging. Charging relay 551 is provided between power storage device 500 and inlet 550. Charging relay 551 is turned on during external charging.

Communication device 570 wirelessly communicates with each of server 30 and vehicle management server 40. Communication device 570 can receive a command value CCV and an upper limit value ULV from server 30. Command value CCV is a command value for an amount of power consumption in an electric device of auxiliary devices 555. Upper limit value ULV is an upper limit value about a running state of vehicle 50, and is specifically a value of a speed upper limit or an acceleration upper limit of vehicle 50. Command value CCV and upper limit value ULV will be described in detail later. Communication device 570 also communicates with power facility 25 through a controller area network (CAN). Data exchanged between vehicle 50 and power facility 25 by CAN communication is also referred to as "CAN data". The CAN data includes information indicating an amount of power supply from power facility 25 to vehicle 50 from start to completion of external charging, information indicating the power rate unit price of power facility 25, and information indicating the completion of external charging.

GPS receiver 571 obtains position information indicating a current position of vehicle 50, based on a radio wave from an artificial satellite. The position information is transmitted to vehicle management server 40 by communication device 570.

HMI device 545 includes a touch screen 546 and a controller 547. Touch screen 546 includes an input interface 548 and a display 549. Input interface 548 receives a user operation. Display 549 displays various screens such as a screen including a map image, and displays the position information of vehicle 50 on the map image. The information indicating the map image is stored in, for example, a memory (not shown) of HMI device 545. Display 549 can also display the placement position of at least one power facility 25 on the map image. Controller 547 controls display 549 in accordance with a user operation performed on input interface 548.

Power conversion device 552 converts (steps down) a voltage of electric power of power storage device 500 and supplies electric power having the converted voltage to auxiliary battery 553. As a result, auxiliary battery 553 is charged with the electric power of power storage device 500 (pumping charging). The pumping charging is performed when an SOC of auxiliary battery 553 is low.

Auxiliary devices 555 include a heater 557 and an air conditioning device 558. Heater 557 is an electric device (auxiliary device) that heats power storage device 500. Air conditioning device 558 is an electric device (auxiliary device) that adjusts a temperature in the compartment of vehicle 50. Each of heater 557 and air conditioning device 558 operates by consuming electric power of auxiliary battery 553. When the electric power of auxiliary battery 553 is consumed, the pumping charging is performed and the electric power of power storage device 500 is consumed. Therefore, each of heater 557 and air conditioning device 558 is also considered to operate by consuming the electric power of power storage device 500.

Data link connector (DLC) connector 585 is connected to a short-range communication device 590. Short-range communication device 590 is an external device that transmits the CAN data to mobile terminal 60 through short-range communication such as Bluetooth (registered trademark).

ECU 580 includes a CPU and a memory (both are not shown). The memory includes a ROM and a RAM. The ROM stores a program performed by the CPU. ECU 580 receives a detection value by each of sensor unit 512, vehicle speed sensor 542 and acceleration sensor 543. For example, in accordance with the detection value by sensor unit 512, ECU 580 calculates the SOC of power storage device 500 and transmits a result of calculation to vehicle management server 40.

ECU 580 controls the devices of vehicle 50, such as SMR 515, PCU 520, MG 530, charging relay 551, communication device 570, HMI device 545, power conversion device 552, and auxiliary devices 555. For example, ECU 580 can control the amount of power consumption in the electric device of auxiliary devices 555, such as heater 557 or air conditioning device 558. As one example, ECU 580 can reduce the amount of power consumption in the electric device by setting the electric device in an ecological mode.

In a case where communication device 570 receives command value CCV, ECU 580 controls the amount of power consumption in the electric device in accordance with command value CCV. In a case where communication device 570 receives upper limit value ULV, ECU 580 controls running of vehicle 50 in accordance with upper limit value ULV. Specifically, ECU 580 controls MG 530 through PCU 520 to prevent the vehicle speed detected by vehicle speed sensor 542 from exceeding the speed upper limit, or to prevent the acceleration detected by acceleration sensor 543 from exceeding the acceleration upper limit.

Power facility 25 includes an HMI device 250, a power conversion device 251, a communication device 252, a storage device 254, and a control device 256.

HMI device 250 receives a user operation providing an instruction to start external charging, when power facility 25 is connected to vehicle 50 through a charging cable 258. HMI device 250 may receive a user operation providing an instruction about the completion time of external charging.

Power conversion device 251 converts AC power from commercial power supply PS into DC power during external charging. The converted power is supplied to inlet 550 through charging cable 258 and a connector 259.

Communication device 252 exchanges the CAN data with communication device 570, and wirelessly communicates with facility management server 20. For example, when power facility 25 is connected to vehicle 50, communication device 252 transmits a signal SG1 to facility management server 20. Signal SG1 indicates that power facility 25 is being used, and the completion time of external charging.

Storage device 254 stores various types of information including the information indicating the power rate unit price of power facility 25. When power facility 25 is the above-described DP facility, the unit price may be set (changed) in accordance with a command from facility management server 20.

Control device 256 controls HMI device 250, power conversion device 251 and communication device 252. Control device 256 starts or stops power supply from power conversion device 251 to inlet 550 in accordance with a user operation using HMI device 250. Control device 256 calculates a use frequency of power facility 25 and stores a result of calculation in storage device 254. The use frequency refers to, for example, the number of times or a time period of power supply to vehicle 50 by power facility 25 during a prescribed time period (a day, a week or a month). Information indicating the use frequency may be transmitted from power facility 25 to facility management server 20.

FIG. 5 illustrates a data structure of facility DB 200 (FIG. 1). Referring to FIG. 5, facility DB 200 includes ID data 205, power rate system data 210, power rate unit price data 215, and placement position data 220.

ID data 205 indicates identification information of each power facility 25 and includes ID information 206A to 206E. ID information 206A to 206E indicate identification information of power facilities 25A to 25E, respectively. Each of ID information 206A to 206E is also referred to as "ID information 206".

Power rate system data 210 indicates a power rate system of each power facility 25 and includes power rate system information 211A to 211E. Power rate system information 211A to 211E indicate power rate systems of power facilities 25A to 25E, respectively. Each of power rate system information 211A to 211E is also referred to as "power rate system information 211". When the power rate system is normal, corresponding power facility 25 is the above-described normal facility. In contrast, when the power rate system is dynamic pricing, corresponding power facility 25 is the above-described DP facility.

Power rate unit price data 215 indicates a power rate unit price of each power facility 25 and includes power rate unit price information 216A to 216E. Power rate unit price information 216A to 216E indicate power rate unit prices of power facilities 25A to 25E, respectively. Each of power rate unit price information 216A to 216E is also referred to as "power rate unit price information 216". Power rate unit price information 216A is related to the normal facility and is constant in time. Each of power rate unit price information 216B to 216E is related to the DP facility and is set by facility management server 20 in accordance with balance information BI (FIG. 1). For example, when the power demand in power grid PG is higher than the power supply, the power rate unit price is set higher as a difference between the power demand and the power supply becomes larger. In contrast, when the power demand in power grid PG is lower than the power supply, the power rate unit price is set lower as a difference between the power demand and the power supply becomes larger. Each of power rate unit price information 216B to 216E may be set to vary in real time. Alternatively, each of power rate unit price information 216B to 216E may be set depending on which of a plurality of preliminarily sectioned time slots the current time is included in (e.g., a power rate unit price in a nighttime time slot may be set lower than the unit price in a daytime time slot).

Placement position data 220 indicates a placement position of each power facility 25 and includes placement position information 221A to 221E. Placement position information 221A to 221E indicate placement positions of power facilities 25A to 25E, respectively. Each of placement position information 221A to 221E is also referred to as "placement position information 221". In this example, each placement position is indicated by a combination of a longitude (X), a latitude (Y) and an elevation (Z).

FIG. 6 illustrates a data structure of vehicle DB 400 (FIG. 1). Referring to FIG. 6, vehicle DB 400 includes ID data 405, electric mileage data 410, SOC data 415, and vehicle position data 420.

ID data 405 indicates identification information of each vehicle 50 and includes a plurality of pieces of ID information 406. ID information 406 indicates identification information of corresponding vehicle 50. Electric mileage data 410 indicates an electric mileage (km/kWh) of each vehicle 50 and includes a plurality of pieces of electric mileage information 411. Electric mileage information 411 indicates an electric mileage of corresponding vehicle 50. The electric mileage is a reference of a distance that can be run by vehicle 50 per amount of unit power consumption in power storage device 500, and is predetermined as appropriate in accordance with a vehicle type (model) of vehicle 50.

SOC data 415 indicates an SOC of each vehicle 50 and includes a plurality of pieces of SOC information 416. SOC information 416 indicates an SOC of corresponding vehicle 50. Vehicle position data 420 indicates position information of each vehicle 50 and includes a plurality of pieces of vehicle position information 421. Vehicle position information 421 indicates position information of corresponding vehicle 50. Vehicle position information 421 is obtained by GPS receiver 571 of vehicle 50 and is indicated by a combination of a longitude (x), a latitude (y) and an elevation (z). Hereinafter, one vehicle 50 of the plurality of vehicles 50 will be described representatively.

When external charging is performed using power facility 25, a power rate is required. It is important for user U to recognize how much the power rate required for external charging is. The inability of user U to recognize information related to the power rate in advance, and the difficulty of user U to recognize such information are undesirable.

Controller 630 of mobile terminal 60 according to the first embodiment controls display 624 to, when the placement position of the at least one power facility 25 is displayed on the map image, display power-rate-related information and the placement position of at least one power facility 25 on the map image. The power-rate-related information is information related to a power rate unit price for external charging (specifically, a power rate unit price of electric power supplied from power facility 25 to vehicle 50). The power-rate-related information is set for each power facility 25 by server 30 (processor 315) in accordance with the power rate unit price of power facility 25.

In the first embodiment, the power-rate-related information is information indicating a power rate required to charge power storage device 500 to a prescribed amount of charging. The prescribed amount of charging is an amount of electric power required to be supplied from power facility 25 to power storage device 500 in order to raise the SOC of power storage device 500 to a charging completion SOC (e.g., 80% or 100%). The charging completion SOC may be stored in the memory of ECU 580, or may be set by user U using HMI device 250. The power-rate-related information is set as information indicating a power rate predicted as a power rate required from start to completion of external charging. How this power rate is predicted will be described in detail later.

As described above, when the power-rate-related information and the placement position are displayed on the map image, the power-rate-related information is displayed on the map image for each power facility 25, together with the placement position. As a result, user U can easily recognize, in advance, the power-rate-related information and the placement position for each power facility 25.

Figure 7:
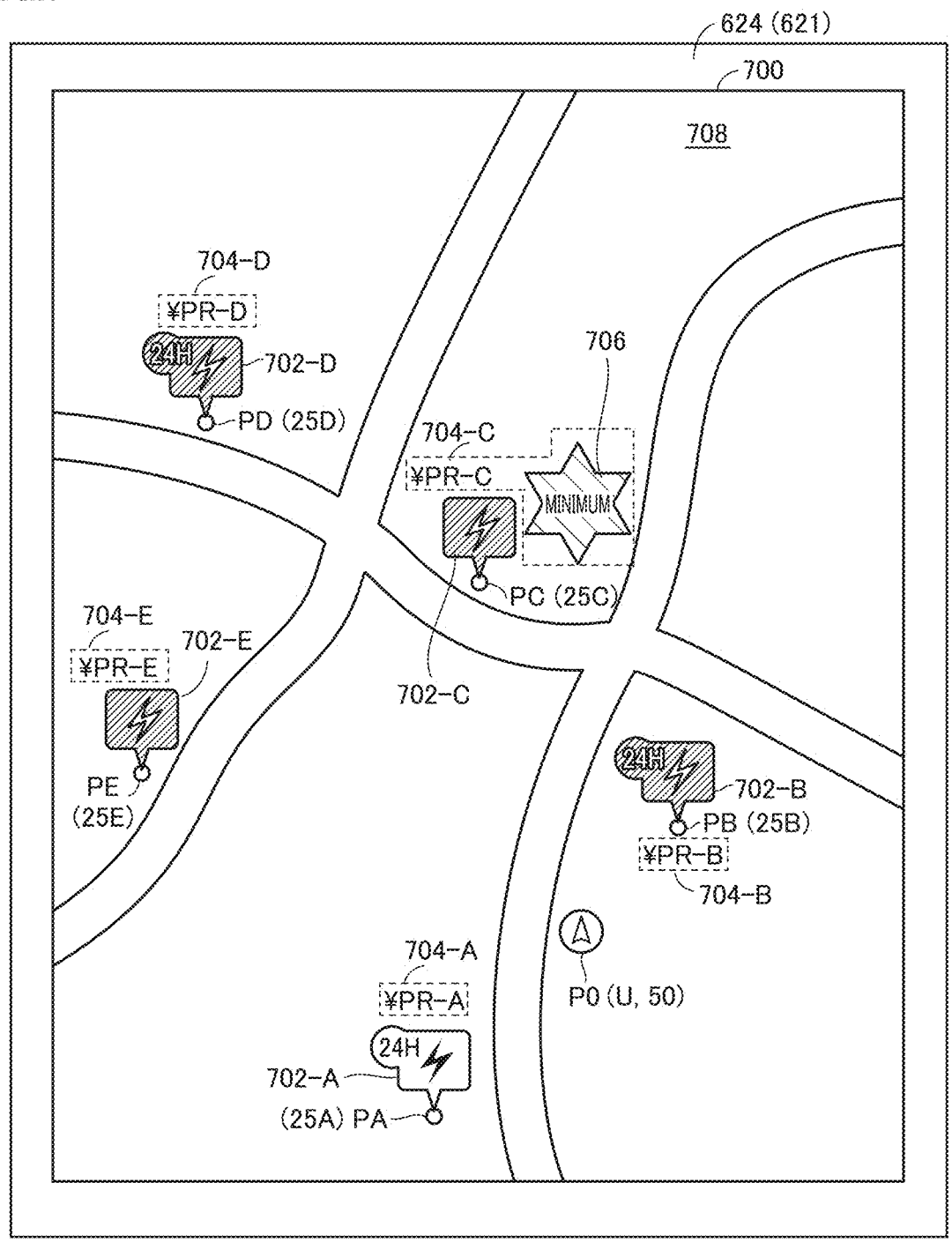
FIG. 7 illustrates a screen displayed on a display in the first embodiment.

FIG. 7 illustrates a screen displayed on display 624 in the first embodiment. The screen is displayed as a result of the above-described information providing process by server 30.

Referring to FIG. 7, a screen 700 displays a position P0, placement positions PA to PE, and power-rate-related information 704-A to 704-E on a map image 708. In accordance with map DB 317, map image 708 is transmitted to mobile terminal 60 by server 30 as an image indicating a map of the above-described nearby area.

Position P0 indicates a current position of vehicle 50 when screen 700 is being displayed. Placement positions PA to PE correspond to the placement positions of power facilities 25A to 25E, respectively. Each of placement positions PA to PE is also referred to as "placement position P".

Icons 702-A to 702-E indicate placement positions PA to PE, respectively. Each of icons 702-A to 702-E is also referred to as icon 702. Icons 702-A to 702-E also indicate whether power facilities 25A to 25E are the normal facility or the DP facility, respectively. Specifically, icon 702 that is not hatched (702-A) indicates placement position P of the normal facility, and icon 702 that is hatched (702-B to 702-E) indicates placement position P of the DP facility.

Power-rate-related information 704-A to 704-E indicate power rates required from start to completion of external charging using power facilities 25A to 25E, respectively. Although the power rates are indicated by the Japanese yen in the first embodiment, the power rates may be indicated by another currency (e.g., dollar, euro or Chinese yuan) instead of the Japanese yen. In this example, power-rate-related information 704-C, 704-B, 704-A, 704-D, and 704-E are displayed in ascending order of the power rate (PR-C<PR-B<PR-A<PR-D<PR-E). Each of power-rate-related information 704-A to 704-E is also referred to as "power-rate-related information 704". Although power-rate-related information 704 is displayed adjacent to corresponding placement position P, power-rate-related information 704 may be displayed away from corresponding placement position P as long as a correspondence relationship therebetween is clearly indicated on screen 700.

As described above, controller 630 controls display 624 to display power-rate-related information 704 and placement position P of each power facility 25 in the nearby area on map image 708.

By hatching icon 702 for the DP facility, of icons 702-A to 702-E, controller 630 controls display 624 to distinguish between the normal facility and the DP facility, and display placement position P and power-rate-related information 704 of the normal facility and placement position P and power-rate-related information 704 of the DP facility on map image 708. As a result, user U can easily recognize placement position P and power-rate-related information 704 of the DP power facility.

Controller 630 may control display 624 to distinguish between a display manner of at least one of placement position P and power-rate-related information 704 of the normal facility and a display manner of at least one of placement position P and power-rate-related information 704 of the DP facility, and display the at least one of placement position P and power-rate-related information 704 of the normal facility and the at least one of placement position P and power-rate-related information 704 of the DP facility on map image 708. For example, controller 630 may control display 624 to distinguish between a display manner of placement position P of the normal facility and a display manner of placement position P of the DP facility, and display placement position P of the normal facility and placement position P of the DP facility on map image 708. Alternatively, controller 630 may control display 624 to distinguish between a display manner of power-rate-related information 704 of the normal facility and a display manner of power-rate-related information 704 of the DP facility, and display power-rate-related information 704 of the normal facility and power-rate-related information 704 of the DP facility on map image 708.

A tag 706 is included in power-rate-related information 704-C. Tag 706 indicates that power facility 25 is a minimum unit price facility. The minimum unit price facility is power facility 25 (in this example, power facility 25C) whose power rate unit price is minimum, of the plurality of power facilities 25 displayed on screen 700. The power facility (each of power facilities 25A, 25B, 25D, and 25E) different from the minimum unit price facility is also referred to as "non-minimum unit price facility".

As described above, by causing display 624 to display tag 706, controller 630 controls display 624 to distinguish between the non-minimum unit price facility and the minimum unit price facility, and display placement position P and power-rate-related information 704 of the non-minimum unit price facility and placement position P and power-rate-related information 704 of the minimum unit price facility on map image 708. As a result, user U can easily recognize placement position P (PC) of the minimum unit price facility.

Controller 630 may control display 624 to distinguish between a display manner of at least one of placement position P and power-rate-related information 704 of the non-minimum unit price facility and a display manner of at least one of placement position P and power-rate-related information 704 of the minimum unit price facility, and display the at least one of placement position P and power-rate-related information 704 of the non-minimum unit price facility and the at least one of placement position P and power-rate-related information 704 of the minimum unit price facility on map image 708. For example, controller 630 may control display 624 to distinguish between a display manner of placement position P of the non-minimum unit price facility and a display manner of placement position P of the minimum unit price facility, and display placement position P of the non-minimum unit price facility and placement position P of the minimum unit price facility on map image 708. Alternatively, controller 630 may control display 624 to distinguish between a display manner of power-rate-related information 704 of the non-minimum unit price facility and a display manner of power-rate-related information 704 of the minimum unit price facility, and display power-rate-related information 704 of the non-minimum unit price facility and power-rate-related information 704 of the minimum unit price facility on map image 708.

By touching any one of icons 702-A to 702-E, user U can determine a planned facility from among power facilities 25A to 25E. This touch operation is also referred to as "planned facility determination operation". The planned facility is a facility planned to be used for external charging. When the planned facility is determined, controller 630 may control communication device 610 to transmit, to server 30, a signal (planned facility determination signal) indicating that the planned facility has been determined and an ID of the planned facility.

Figure 8:
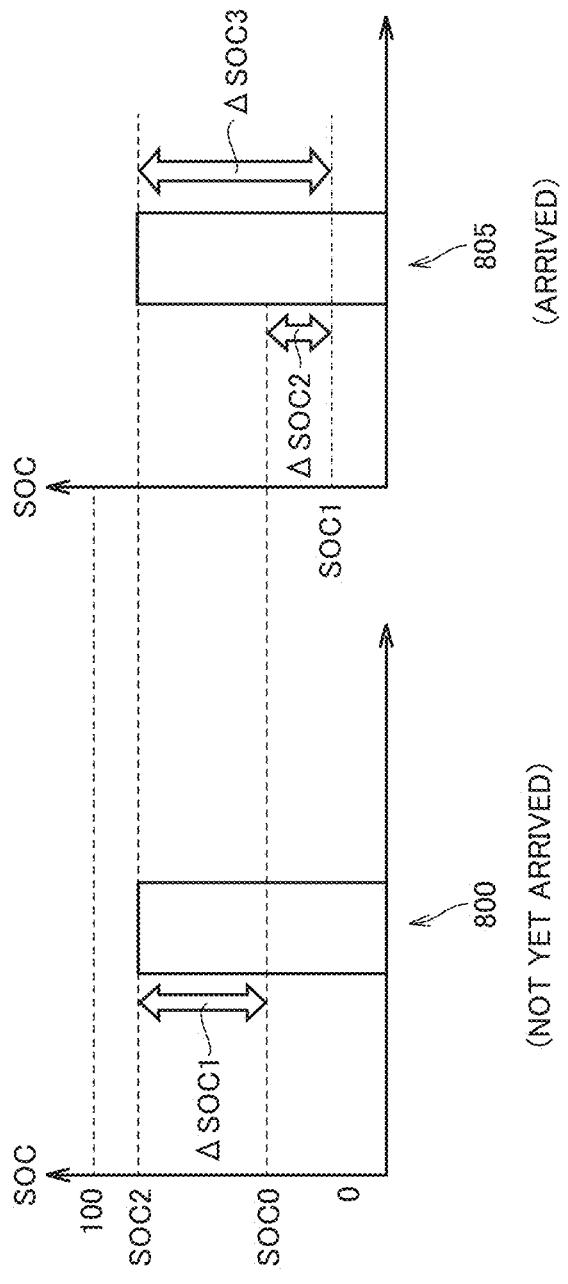
FIG. 8 is a diagram for describing a method for predicting a power rate required from start to completion of external charging.

FIG. 8 is a diagram for describing a method for predicting the power rate required from start to completion of external charging. The power rate is predicted by server 30 for each power facility 25.

Referring to FIG. 8, a graph 800 shows an SOC when vehicle 50 is located at position P0 (SOC0) and an SOC when external charging using power facility 25 completes (SOC2). When the SOC is at SOC0, vehicle 50 has not yet arrived at power facility 25. SOC2 is stored in the memory of ECU 580 and is, for example, 80%. SOC2 may be set by the user using HMI device 250. A difference between SOC0 and SOC2 is indicated by ΔSOC1.

A graph 805 shows an arrival SOC (SOC1) predicted as an SOC when vehicle 50 has arrived at power facility 25, and the SOC when external charging completes (SOC2). SOC1 is estimated as an SOC when external charging starts (charging start SOC), and is lower than SOC0 by ΔSOC2. In this example, SOC1 is estimated when vehicle 50 is located at position P0.

Server 30 estimates SOC1 as follows. Server 30 first calculates a distance from position P0 of vehicle 50 to placement position P of power facility 25 of interest. In accordance with the above-described distance and electric mileage of vehicle 50, server 30 predicts an amount of power consumption in power storage device 500 under the assumption that vehicle 50 would run to power facility 25 of interest. Server 30 converts the amount of power consumption into an amount of reduction in SOC (ΔSOC2).

Server 30 subtracts ΔSOC2 from the current SOC (SOC0), to estimate the SOC when vehicle 50 arrives at power facility 25 of interest (SOC1). Server 30 calculates ΔSOC3, which is a difference between the charging completion SOC (SOC2) that is the SOC when external charging completes and the charging start SOC (SOC1), and converts ΔSOC3 into an amount of power supply. ΔSOC3 is a sum of ΔSOC1 and ΔSOC2, and corresponds to an amount of rise in SOC caused by external charging. Server 30 multiplies the power rate unit price of power facility 25 of interest by the converted amount of power supply, to predict the power rate required from start to completion of external charging.

As described above, the power rate is predicted for each power facility 25 in accordance with the charging completion SOC, the charging start SOC estimated as an SOC when vehicle 50 arrives at corresponding power facility 25 (i.e., power facility 25 of interest), and the power rate unit price of corresponding power facility 25.

The charging start SOC (arrival SOC) may vary depending on the amount of power consumption in power storage device 500 before vehicle 50 arrives at power facility 25 (distance between vehicle 50 and power facility 25). When the power rate is predicted as described above, the above-described amount of power consumption is reflected in the power rate. As a result, the power rate required from start to completion of external charging can be calculated accurately.

Figure 9:
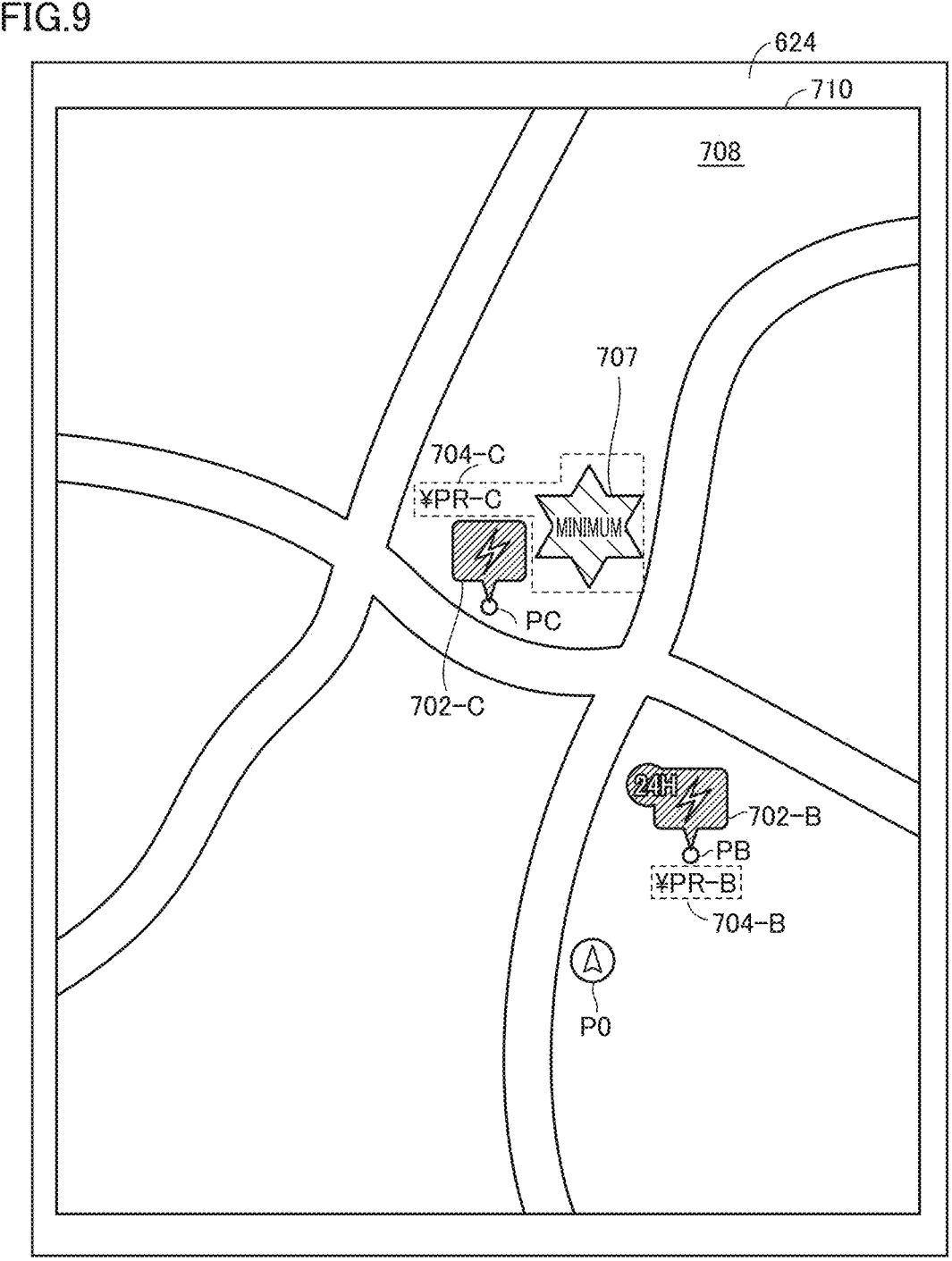
FIG. 9 illustrates another example of the screen displayed on the display in the first embodiment.

FIG. 9 illustrates another example of the screen displayed on display 624 in the first embodiment. Referring to FIG. 9, a screen 710 displays position P0, placement positions PB and PC, and power-rate-related information 704-B and 704-C on map image 708. Screen 710 is different from screen 700 (FIG. 7) in that screen 710 does not display placement positions PA, PD and PE, and power-rate-related information 704-A, 704-D and 704-E on map image 708.

Controller 630 controls display 624 to display placement position P and power-rate-related information 704 of the DP facility on map image 708, without displaying placement position P and power-rate-related information 704 of the normal facility on map image 708, when the power rate unit price of the DP facility in the nearby area, of the plurality of power facilities 25, is lower than the power rate unit price of the normal facility. Controller 630 controls display 624 not to display, on screen 710, placement position P and power-rate-related information 704 of the normal facility, and placement position P and power-rate-related information 704 of the DP facility that is higher in power rate unit price than the normal facility. In this example, placement position P and power-rate-related information 704 of each of power facilities 25B and 25C that are lower in power rate unit price than the normal facility are displayed, whereas placement position P and power-rate-related information 704 of each of power facilities 25A, 25D and 25E are not displayed.

As described above, according to screen 710, only placement position P and power-rate-related information 704 of the DP facility that is lower in power rate unit price than the normal facility are displayed. As a result, user U can easily recognize placement position P and power-rate-related information 704 of such DP facility.

Information indicating an actual amount of power supply from power facility 25 to vehicle 50 from start to completion of external charging is included in the CAN data and is transmitted from short-range communication device 590 to mobile terminal 60 after external charging completes. Controller 630 controls display 624 to calculate an actual value of the power rate from start to completion of external charging in accordance with the above-described actual amount of power supply and the power rate unit price of power facility 25, and display the actual value, after external charging. The actual value may be calculated by power facility 25 and transmitted to mobile terminal 60 through short-range communication device 590 as a part of the CAN data.

When the actual value of the power rate is displayed on display 624, the user can recognize a degree of a difference between the actual value and the predicted value of the power rate.

Figure 10:
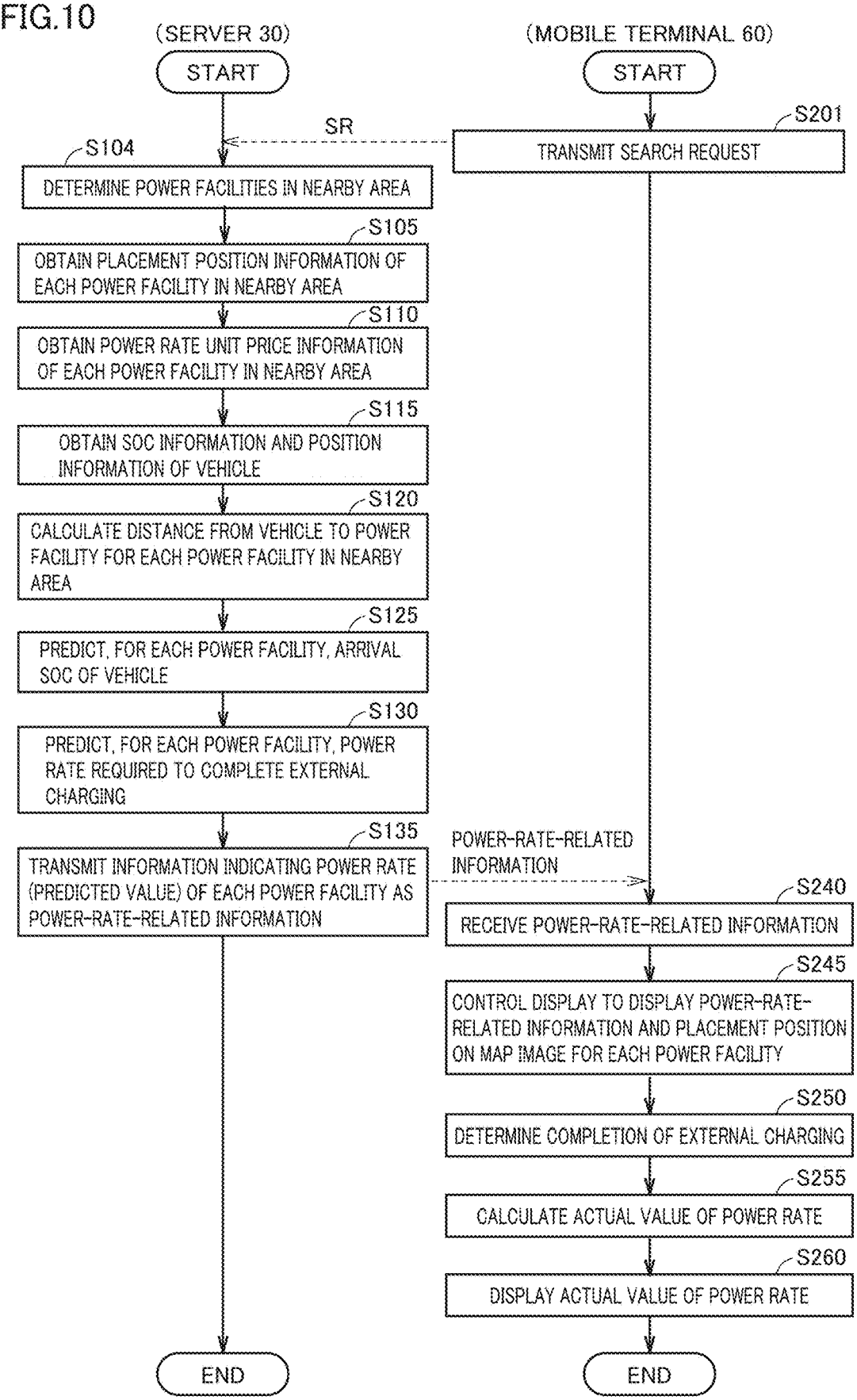
FIG. 10 is a flowchart illustrating a process performed in relation to an information providing process.

FIG. 10 is a flowchart illustrating a process performed in relation to the above-described information providing process. The flowchart is started by mobile terminal 60 in response to the user operation that provides an instruction to search for power facility 25 in the nearby area. Hereinafter, a step will be abbreviated as "S".

Referring to FIG. 10, mobile terminal 60 transmits search request SR (FIG. 1) to server 30 (S201). Search request SR includes the user ID and the position information of user U.

When server 30 receives search request SR (FIG. 1), server 30 accesses facility DB 200 and determines power facilities 25 (more specifically, ID information 206 thereof) in the nearby area in accordance with the position information of user U and placement position data 220 (S104). In this example, power facilities 25 in the nearby area are power facilities 25A to 25E. Then, server 30 obtains placement position information 221 of each power facility 25 in the nearby area from facility DB 200 (S105), and obtains power rate unit price information 216 of each power facility 25 in the nearby area from facility DB 200 (S110).

Server 30 accesses vehicle DB 400 and determines ID information 406 of vehicle 50 that is preliminarily associated with the user ID included in search request SR. Server 30 obtains SOC information 416 and vehicle position information 421 of determined vehicle 50 from vehicle DB 400 (S115). Vehicle position information 421 of vehicle 50 may be replaced by the position information of mobile terminal 60, which is the position information of user U.

Server 30 calculates, for each power facility 25 in the nearby area, the distance from vehicle 50 to power facility 25 in accordance with placement position data 220 and vehicle position data 420 (S120), and predicts, for each power facility 25, the SOC when vehicle 50 arrives at power facility 25 (S125).

Server 30 predicts, for each power facility 25, the power rate required from start to completion of external charging, in accordance with the charging start SOC, which is the arrival SOC about corresponding power facility 25, the charging completion SOC, and the power rate unit price of power facility 25 (S130).

Server 30 (communication device 310) transmits predicted power rate information indicating the power rate (predicted value) of each power facility 25 to mobile terminal 60 as the power-rate-related information (S135). Furthermore, server 30 transmits information indicating placement position P around the current position of user U to mobile terminal 60, together with the power-rate-related information.

When mobile terminal 60 receives the power-rate-related information (S240), mobile terminal 60 controls display 624 to display power-rate-related information 704 and placement position P around the current position of user U on map image 708 for each power facility 25 (S245). Then, the above-described planned facility determination operation is performed and the planned facility determination signal is transmitted from mobile terminal 60 to server 30. After that, vehicle 50 arrives at the planned facility and external charging is started.

Mobile terminal 60 determines the completion of external charging in accordance with the CAN data transmitted from short-range communication device 590 (S250). Mobile terminal 60 calculates the actual value of the power rate (S255), and displays the actual value on display 624 (S260). Thereafter, the process in FIG. 10 ends.

As described above, according to the first embodiment, power-rate-related information 704 is displayed on map image 708 for each power facility 25, together with placement position P. As a result, user U can easily recognize power-rate-related information 704 and placement position P for each power facility 25 in advance.

First Modification of First Embodiment

Figure 11:
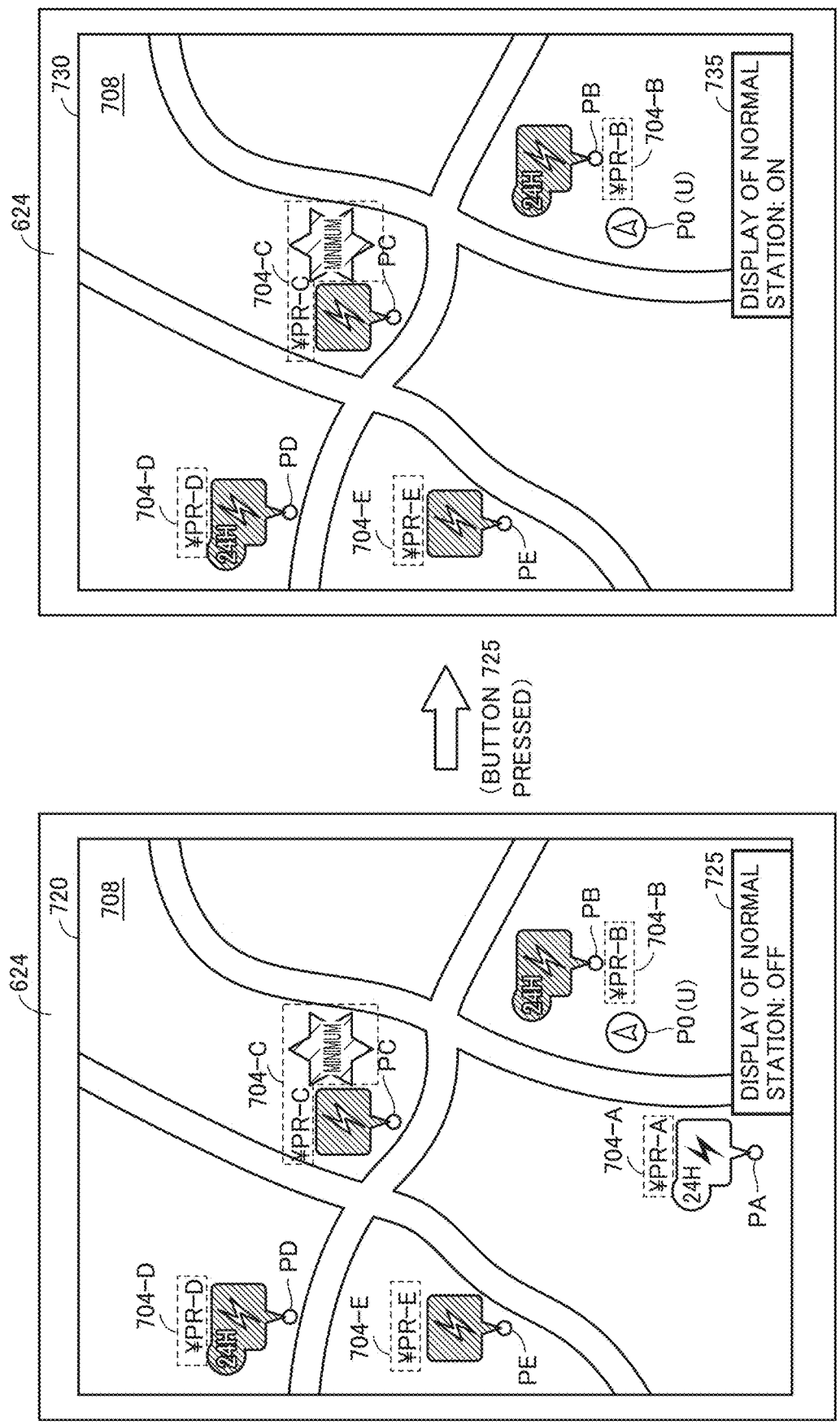
FIG. 11 illustrates a screen displayed on a display in a first modification.

FIG. 11 illustrates a screen displayed on display 624 in a first modification. Referring to FIG. 11, a screen 720 is different from screen 700 in that screen 720 further includes a button 725. Button 725 is operated to hide placement position P and power-rate-related information 704 of the normal facility, of placement positions P and power-rate-related information 704 of the plurality of power facilities 25. When button 725 is operated (pressed) by user U, controller 630 controls display 624 to display a screen 730 (to change screen 720 to screen 730), in response to this user operation. The operation of pressing button 725 corresponds to "first operation" in the present disclosure.

Screen 730 displays, on map image 708, only placement position P and power-rate-related information 704 of at least one DP facility, of placement positions P and power-rate-related information 704 of the plurality of power facilities 25. As a result, user U can easily recognize placement position P and power-rate-related information 704 of the DP facility around user U. When a button 735 of screen 730 is pressed, screen 730 returns to screen 720. Screen 730 is effective when the DP facility that is lower in power rate unit price than the normal facility is present.

Figure 12:
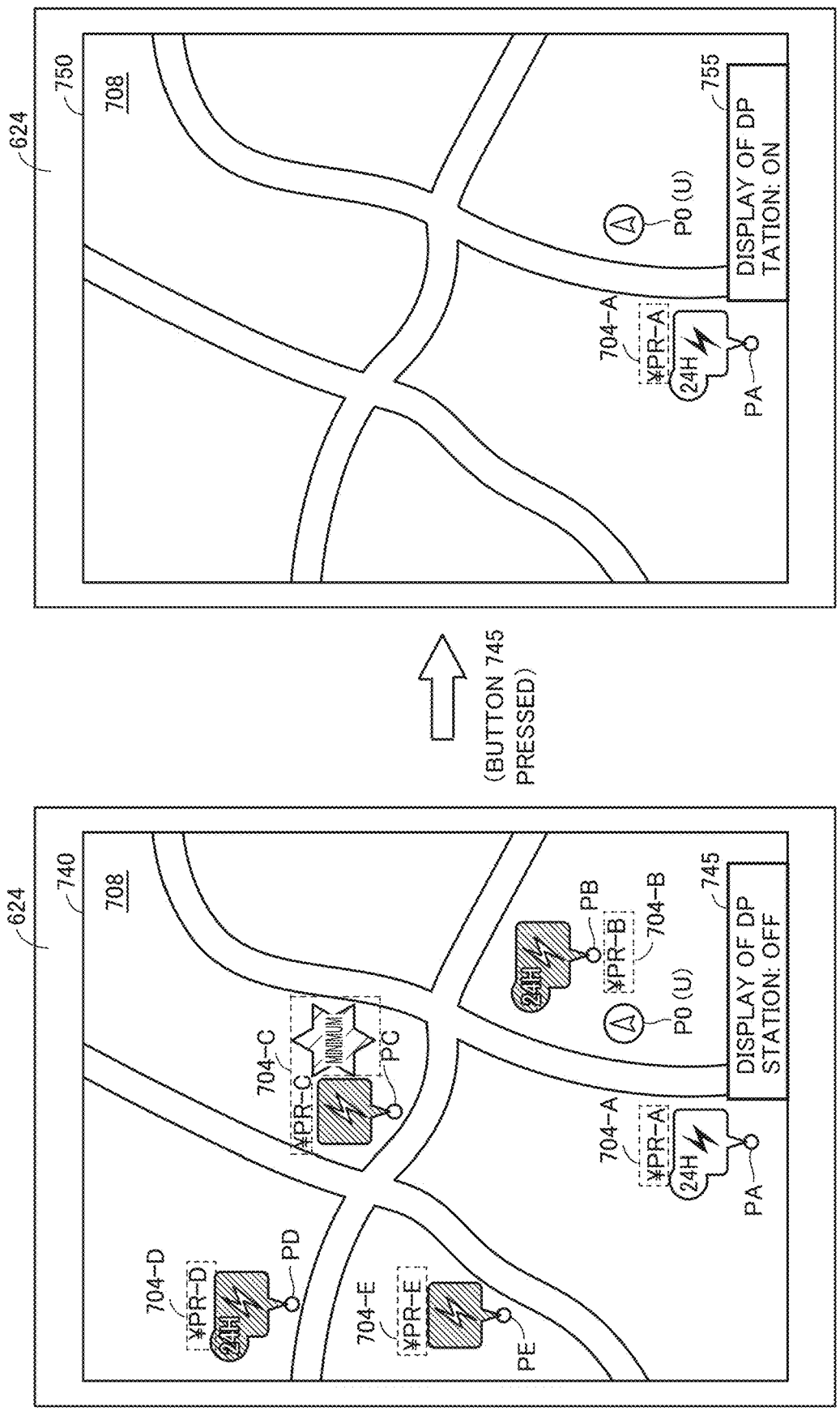
FIG. 12 illustrates another example of the screen displayed on the display in the first modification.

FIG. 12 illustrates another example of the screen displayed on display 624 in the first modification. Referring to FIG. 12, a screen 740 is different from screen 700 in that screen 740 further includes a button 745. Button 745 is operated to hide placement position P and power-rate-related information 704 of the DP facility, of placement positions P and power-rate-related information 704 of the plurality of power facilities 25. When button 745 is operated (pressed) by user U, controller 630 controls display 624 to display a screen 750 (to change screen 740 to screen 750), in response to this user operation. The operation of pressing button 745 corresponds to "second operation" in the present disclosure.

Screen 750 displays, on map image 708, only placement position P and power-rate-related information 704 of at least one (in this example, one) normal facility, of placement positions P and power-rate-related information 704 of the plurality of power facilities 25. As a result, user U can easily recognize placement position P and power-rate-related information 704 of the normal facility around user U. When a button 755 of screen 750 is pressed, screen 750 returns to screen 740. Screen 750 is effective when the DP facility that is higher in power rate unit price than the normal facility is present.

According to the first modification, user U can easily search for only the DP facility or the normal facility around user U. Therefore, the user interface can be improved.

Second Modification of First Embodiment

Figure 13:
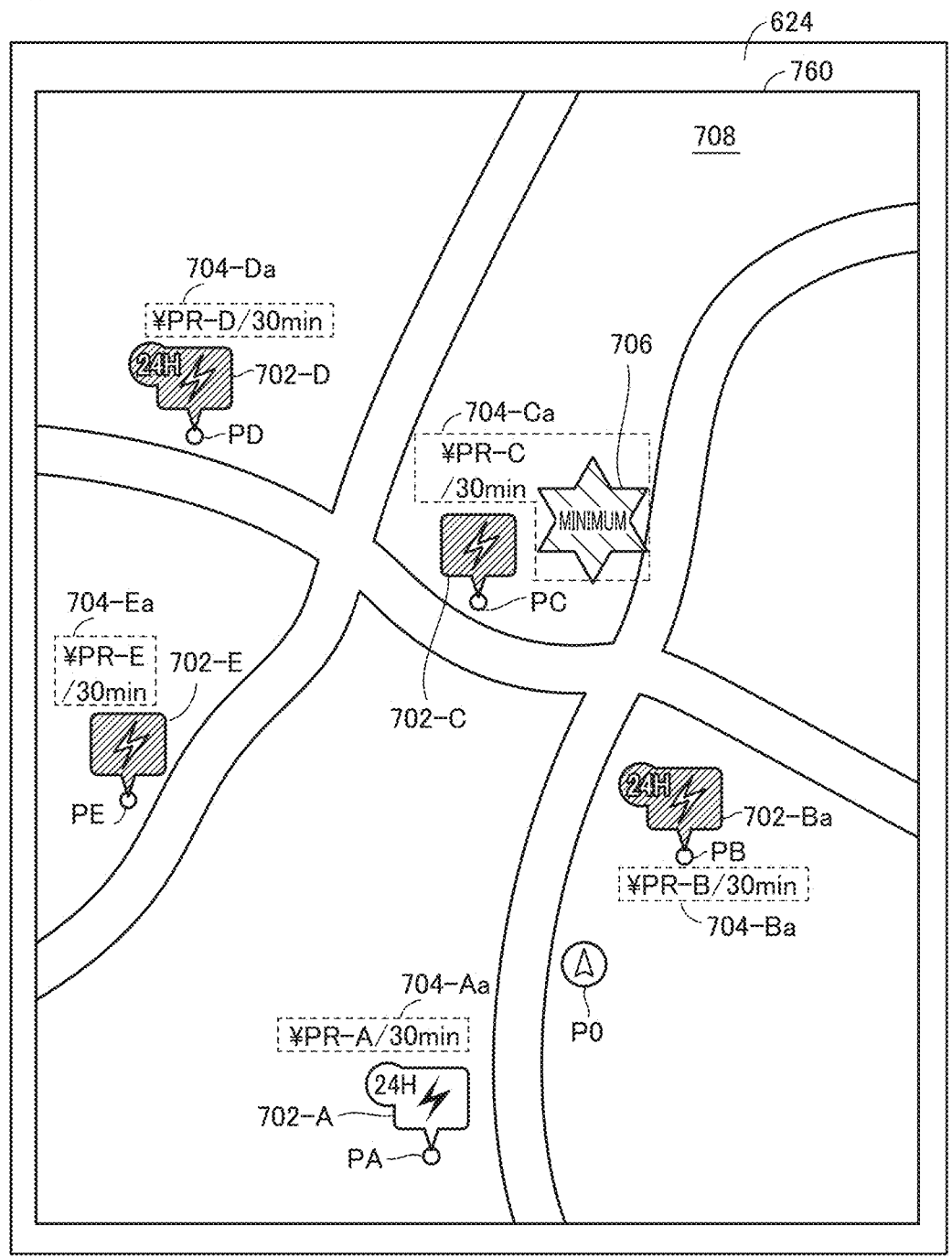
FIG. 13 illustrates a screen displayed on a display in a second modification.

FIG. 13 illustrates a screen displayed on display 624 in a second modification. Referring to FIG. 13, a screen 760 is different from screen 700 in that screen 760 displays power-rate-related information 704-Aa to 704-Ea, each of which corresponds to power-rate-related information 704. Each of power-rate-related information 704-Aa to 704-Ea indicates a power rate required to perform external charging by using power facility 25 for a prescribed unit period, and is set by server 30. In this example, the unit period is 30 minutes.

Figure 14:
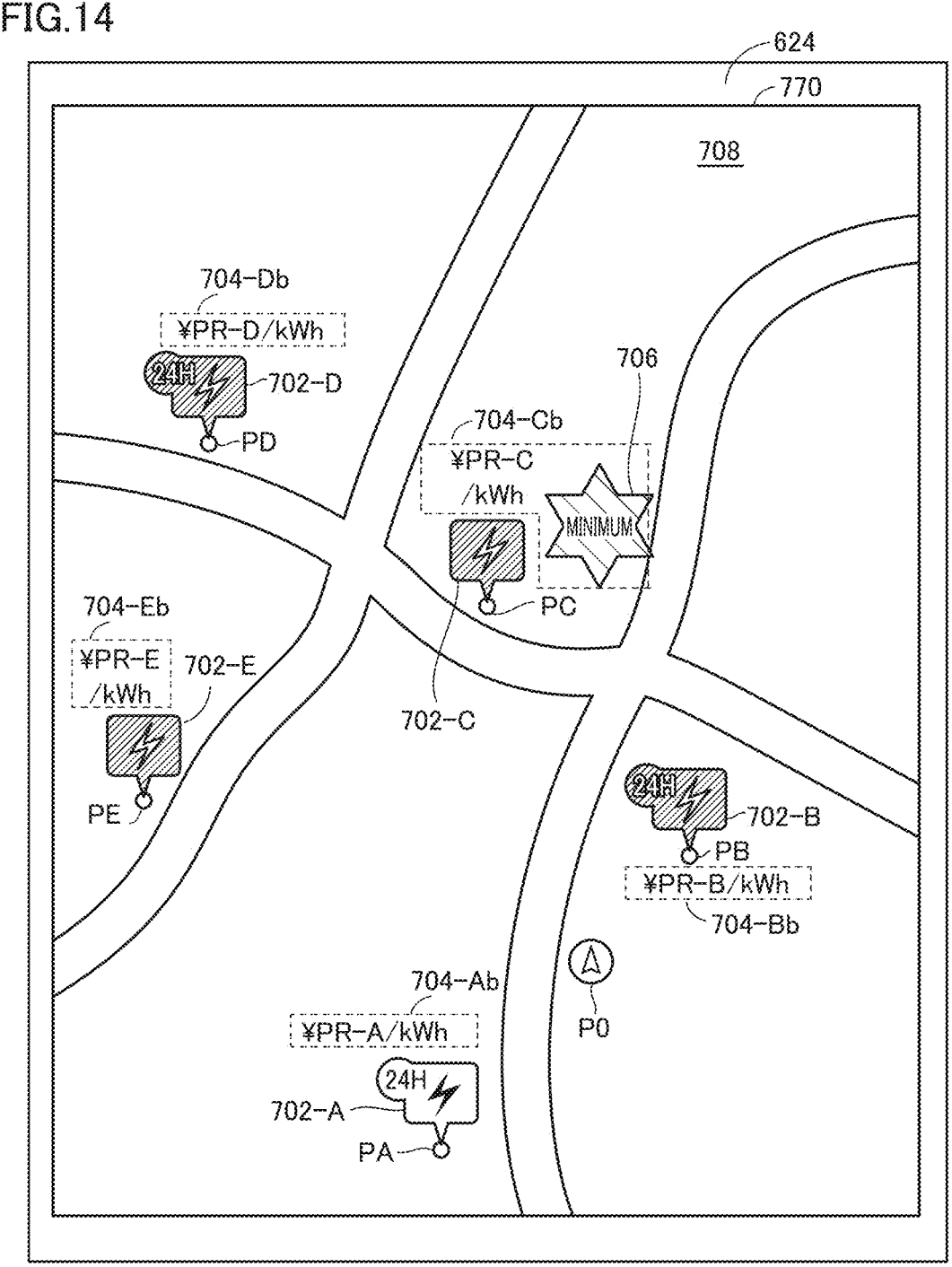
FIG. 14 illustrates another example of the screen displayed on the display in the second modification.

FIG. 14 illustrates another example of the screen displayed on display 624 in the second modification. Referring to FIG. 14, a screen 770 is different from screen 700 in that screen 770 displays power-rate-related information 704-Ab to 704-Eb, each of which corresponds to power-rate-related information 704. Each of power-rate-related information 704-Ab to 704-Eb is information indicating a power rate unit price of power facility 25 (power rate per amount of unit power supplied from power facility 25 to vehicle 50), and is set by server 30.

As described above, power-rate-related information 704 may be information indicating the power rate required to perform external charging for the prescribed unit period, or may be information indicating the power rate unit price of power facility 25. Alternatively, power-rate-related information 704 may be information indicating at least one of the power rate required from start to completion of external charging, the power rate required to perform external charging for the prescribed unit period, or the power rate unit price of power facility 25.

According to the second modification, power-rate-related information 704 can be displayed in various ways. Therefore, the user interface can be improved.

Third Modification of First Embodiment

Controller 630 may control display 624 to further display a waiting time of at least one power facility 25 on map image 708. When power facility 25 is being used, the waiting time is a time period from the current time to the completion time of external charging indicated by signal SG1 (FIG. 4). When power facility 25 is not being used, the waiting time is zero. Controller 630 receives signal SG1 from each power facility 25 through facility management server 20, server 30 and communication device 610, and determines the waiting time of each power facility 25 in accordance with corresponding signal SG1.

Figure 15:
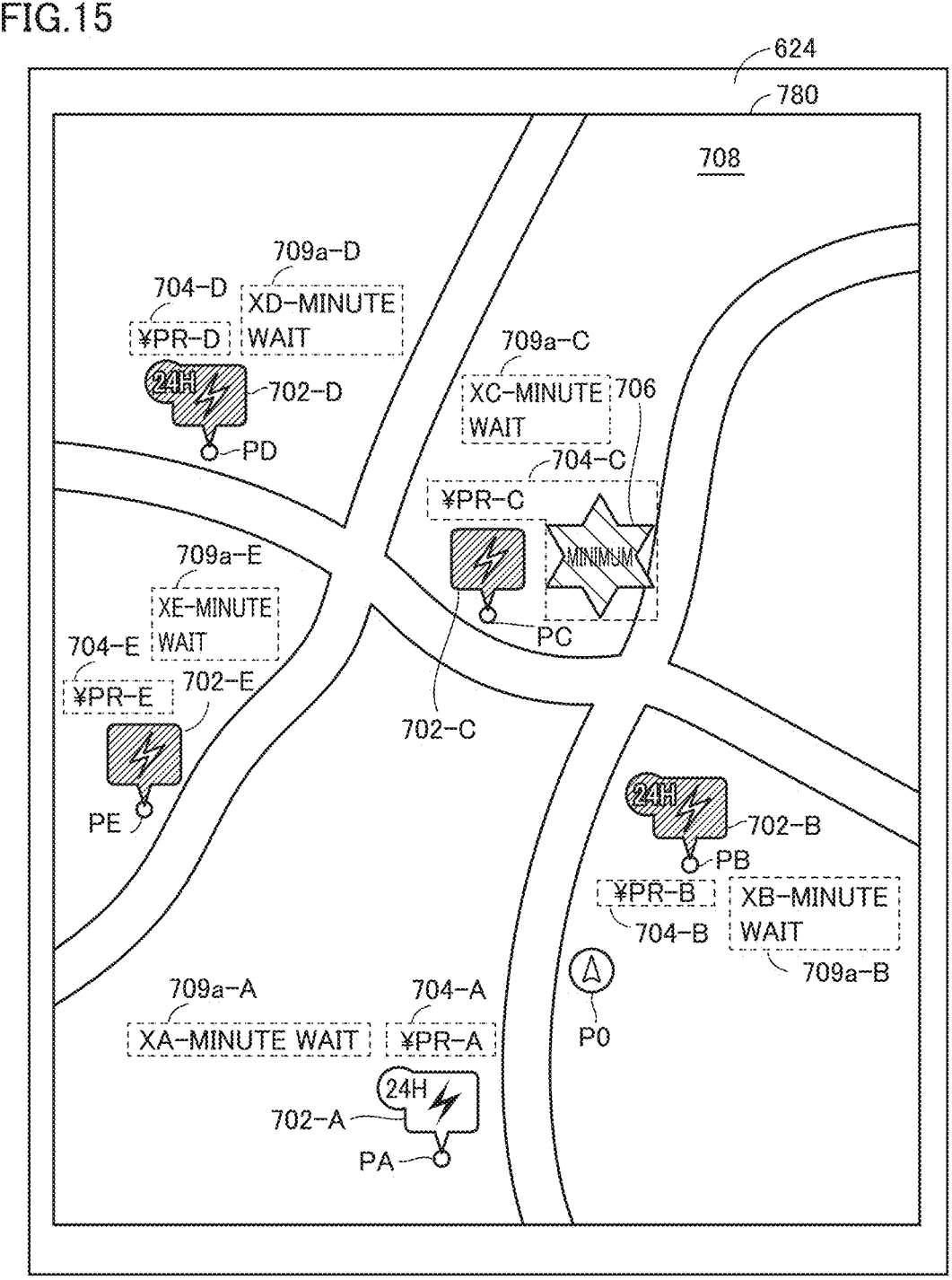
FIG. 15 illustrates a screen displayed on a display in a third modification.

FIG. 15 illustrates a screen displayed on display 624 in a third modification. Referring to FIG. 15, a screen 780 is different from screen 700 in that screen 780 further displays waiting time information 709a of each power facility 25 on map image 708, together with power-rate-related information 704 and placement position P. Waiting time information 709a indicates the waiting time of corresponding power facility 25. Waiting time information 709a of power facilities 25A to 25E is also referred to as waiting time information 709a-A to 709a-E, respectively.

According to screen 780, user U can also easily recognize the waiting time of each power facility 25.

Fourth Modification of First Embodiment

When power facility 25 is a facility that is less frequently used (less-frequently-used facility), power facility 25 may degrade. In a fourth modification, the less-frequently-used facility corresponds to a power facility whose use frequency is lower than a threshold value, of at least one power facility 25. The threshold value is predetermined as appropriate by experiment as a value indicating that power facility 25 may degrade when the use frequency is less than the threshold value.

In the fourth modification, when power storage device 500 is charged by the less-frequently-used facility, an incentive is given to user U. The incentive is, for example, points that can be used at various stores.

Figure 16:
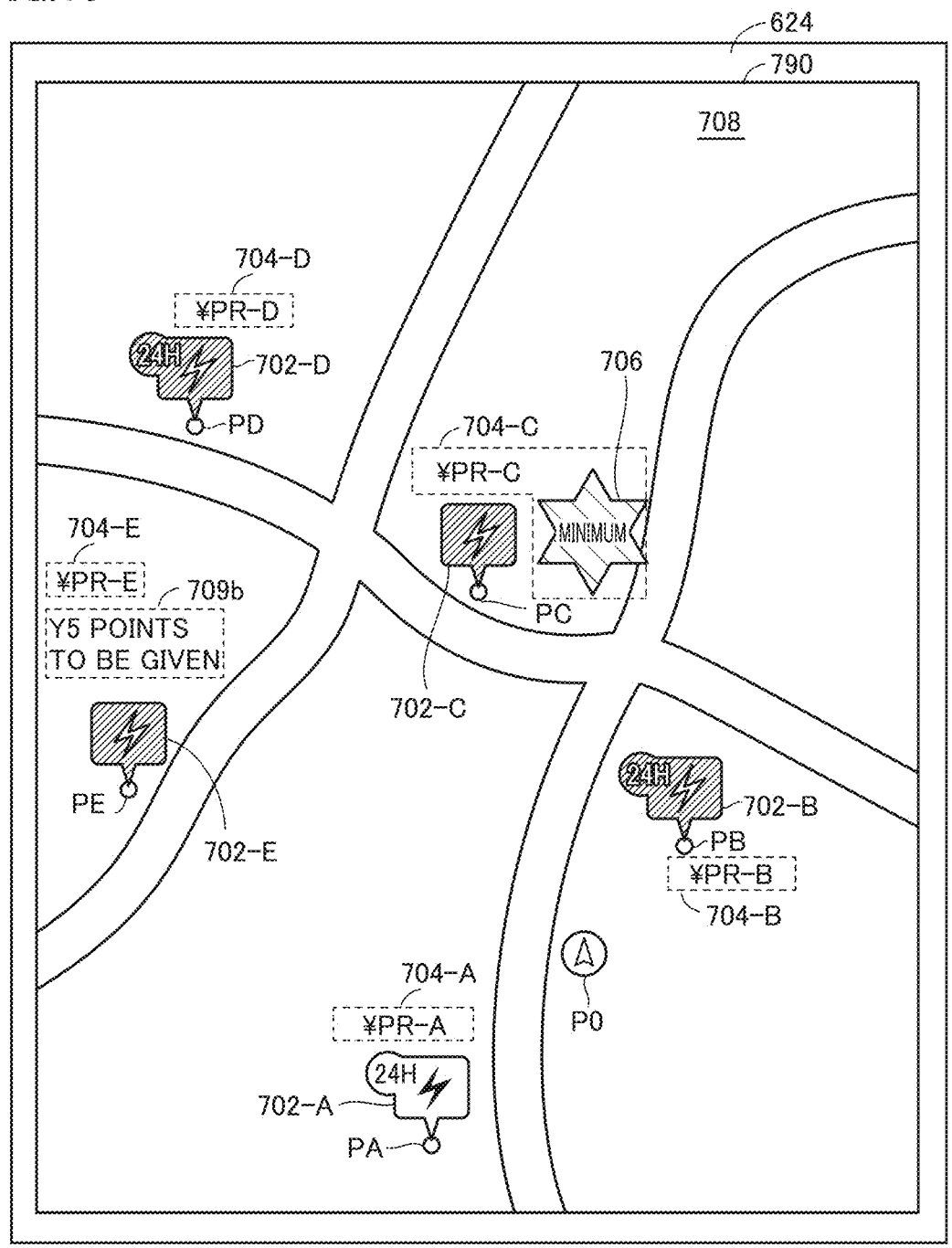
FIG. 16 illustrates a screen displayed on a display in a fourth modification.

FIG. 16 illustrates a screen displayed on display 624 in the fourth modification. Referring to FIG. 16, a screen 790 is different from screen 700 in that screen 790 further displays incentive information 709b. Incentive information 709b indicates a degree of an incentive of the less-frequently-used facility (in this example, power facility 25E).

Controller 630 controls display 624 to display incentive information 709b on map image 708, together with power-rate-related information 704 and placement position P of the less-frequently-used facility. The incentive is set by facility management server 20 based on the use frequency of power facility 25, and is, for example, set higher as the use frequency becomes lower. The information indicating the incentive is transmitted from facility management server 20 through server 30 to mobile terminal 60.

As described above, when the degree of the incentive is displayed, user U can be motivated to perform external charging by using the less-frequently-used facility. As a result, such power facility can be appropriately used and degradation of the less-frequently-used facility can be prevented.

Second Embodiment

In a second embodiment, server 30 transmits command value CCV (FIG. 4) to vehicle 50, and ECU 580 controls the devices of vehicle 50 in accordance with command value CCV. Command value CCV is a command value for the amount of power consumption in the electric device of auxiliary devices 555.

When the planned facility planned to be used for external charging, of at least one power facility 25, is determined, server 30 performs a first setting process for setting command value CCV for the amount of power consumption in the electric device of auxiliary devices 555 before external charging. This electric device is, for example, heater 557 or air conditioning device 558. The first setting process includes setting command value CCV to be lower when the power rate unit price of the planned facility is higher, than when the power rate unit price of the planned facility is lower.

As an amount of heating by heater 557 becomes larger, or as a difference between a set temperature of air conditioning device 558 and a current temperature in the vehicle compartment becomes larger, the amount of power consumption in auxiliary battery 553 becomes larger. According to the first setting process, when the power rate unit price is high, the amount of power consumption in the electric device is reduced by ECU 580. Thus, the pumping charging is less likely to be performed before vehicle 50 arrives at the planned facility, and thus, the SOC of power storage device 500 is less likely to decrease. As a result, the charging start SOC, which is the SOC when vehicle 50 arrives at the planned facility, can be made higher. Therefore, a difference between the charging start SOC and the charging completion SOC can be made smaller. Thus, the power rate required from start to completion of external charging can be reduced. In contrast, when the power rate unit price is low, external charging can be performed inexpensively after vehicle 50 arrives at the planned facility, even if the electric device such as heater 557 or air conditioning device 558 fully demonstrates the capability thereof. Therefore, it is possible to avoid an excessive increase in power rate, while allowing the electric device to fully operate (e.g., enhancing the temperature comfort in the vehicle compartment).

A configuration of a power processing system in the second embodiment is basically similar to the configuration of power processing system 1 in the first embodiment (FIGS. 1 to 6). Therefore, detailed description will not be repeated.

Figure 17:
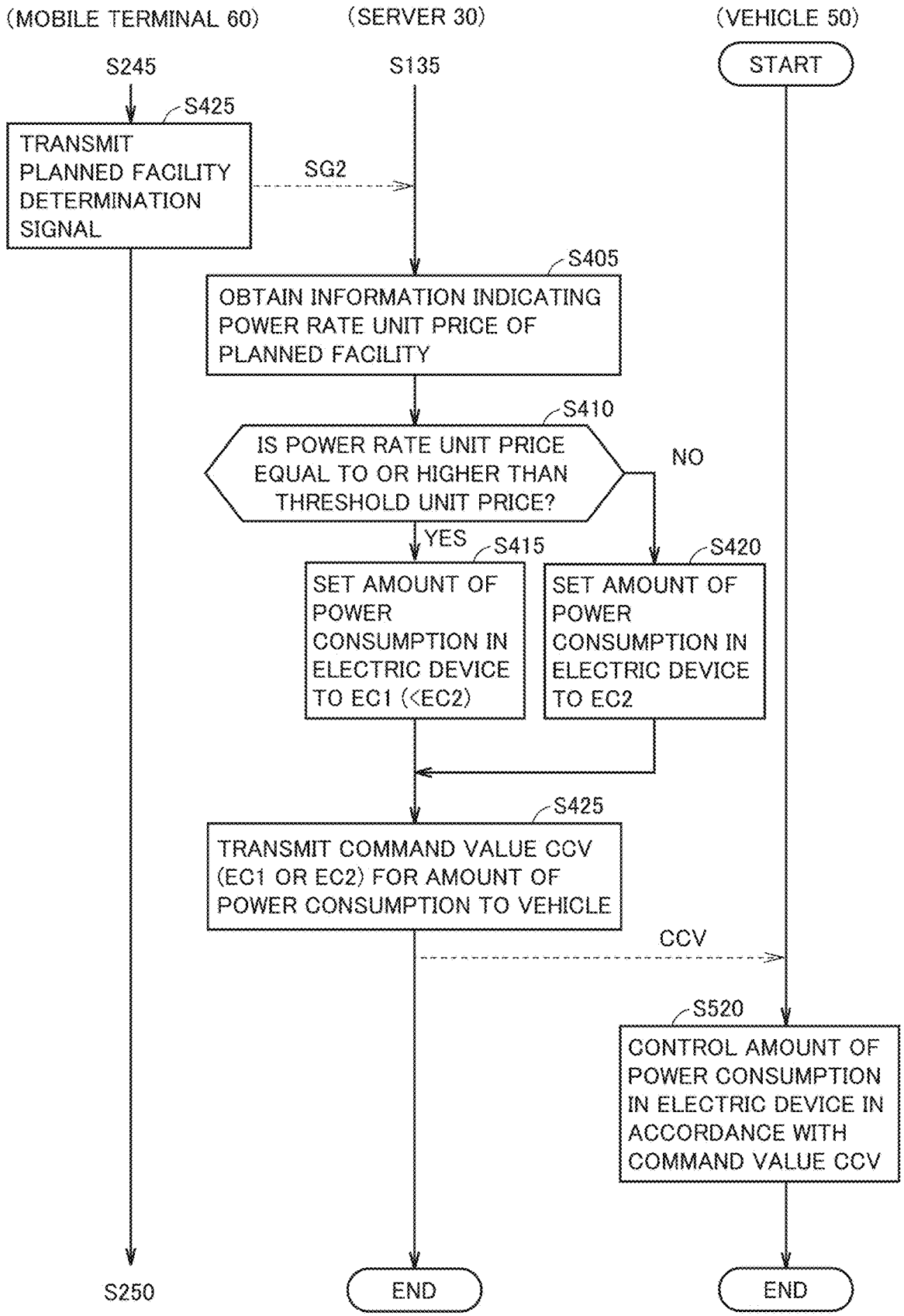
FIG. 17 is a flowchart illustrating a process performed by a server in a second embodiment.

FIG. 17 is a flowchart illustrating a process performed by server 30 in the second embodiment. The flowchart is started by mobile terminal 60 when the planned facility determination operation is performed after power-rate-related information 704 and placement position P are displayed on map image 708 in S245 (FIG. 10) and before external charging is started.

Referring to FIG. 17, in response to the planned facility determination operation, mobile terminal 60 transmits a planned facility determination signal SG2 to server 30. Thereafter, the process of mobile terminal 60 proceeds to S250.

In response to the reception of planned facility determination signal SG2, server 30 obtains, from facility DB 200, information indicating the power rate unit price of the planned facility (S405). Specifically, server 30 obtains, from facility DB 200, power rate unit price information 216 indicating the power rate unit price corresponding to a planned facility ID indicated by the planned facility determination signal.

Server 30 determines whether the power rate unit price of the planned facility is equal to or higher than a prescribed threshold unit price (S410). The threshold unit price is, for example, an average of the power rate unit prices of power facilities 25 in the nearby area. When the power rate unit price is equal to or higher than the threshold unit price (YES in S410), server 30 sets the amount of power consumption in the electric device to EC1 (<EC2) (S415). In contrast, when the power rate unit price is lower than the threshold unit price (NO in S410), server 30 sets the amount of power consumption in the electric device to EC2 (S420). EC2 is, for example, a default amount of power consumption. After S415 or S420, server 30 transmits, to vehicle 50, command value CCV determined based on which of these steps is performed (S425). Specifically, when S415 is performed, command value CCV shows EC1. In contrast, when S420 is performed, command value CCV shows EC2. After S425, the process of server 30 ends.

In response to the reception of command value CCV, vehicle 50 (ECU 580) controls the amount of power consumption in the electric device in accordance with command value CCV (S520). For example, when command value CCV shows EC1, the control by ECU 580 corresponds to setting the electric device to the ecological mode. After S520, the process in FIG. 17 ends.

Modification of Second Embodiment

In this modification, server 30 transmits an upper limit value ULV to vehicle 50, and ECU 580 controls running of vehicle 50 in accordance with upper limit value ULV. As described above, upper limit value ULV is the speed upper limit value or the acceleration upper limit value of vehicle 50.

When the planned facility planned to be used for external charging, of at least one power facility 25, is determined, server 30 performs a second setting process for setting upper limit value ULV. The second setting process includes setting the upper limit value to be lower when the power rate unit price of the planned facility is higher, than when the power rate unit price of the planned facility is lower. When the speed upper limit is set by the second setting process, ECU 580 controls PCU 520 to prevent a rotation speed of MG 530 from exceeding a rotation speed upper limit. When the acceleration upper limit is set by the second setting process, ECU 580 controls PCU 520 to prevent torque of MG 530 from exceeding a torque upper limit.

As the speed of vehicle 50 becomes higher, the amount of power consumption in power storage device 500 becomes larger. Similarly, as the acceleration of vehicle 50 becomes larger, the amount of power consumption in power storage device 500 becomes larger. According to the second setting process, when the power rate unit price is high, the upper limit value is set low. Thus, an increase in speed of vehicle 50 to exceed the speed upper limit or an increase in acceleration of vehicle 50 to exceed the acceleration upper limit is avoided. As a result, the electric power of power storage device 500 is less likely to be consumed before vehicle 50 arrives at the planned facility, and thus, the SOC is less likely to decrease. Therefore, similarly to the second embodiment, the SOC when the vehicle arrives at the planned facility can be made higher and the power rate at the time of external charging using the planned facility can be reduced. In contrast, when the power rate unit price is low, vehicle 50 can perform external charging inexpensively after vehicle 50 arrives at the planned facility. Therefore, server 30 does not need to set the speed upper limit or the acceleration upper limit low in order to reduce the power consumption in power storage device 500. As a result, loss of drivability can be avoided.

Figure 18:
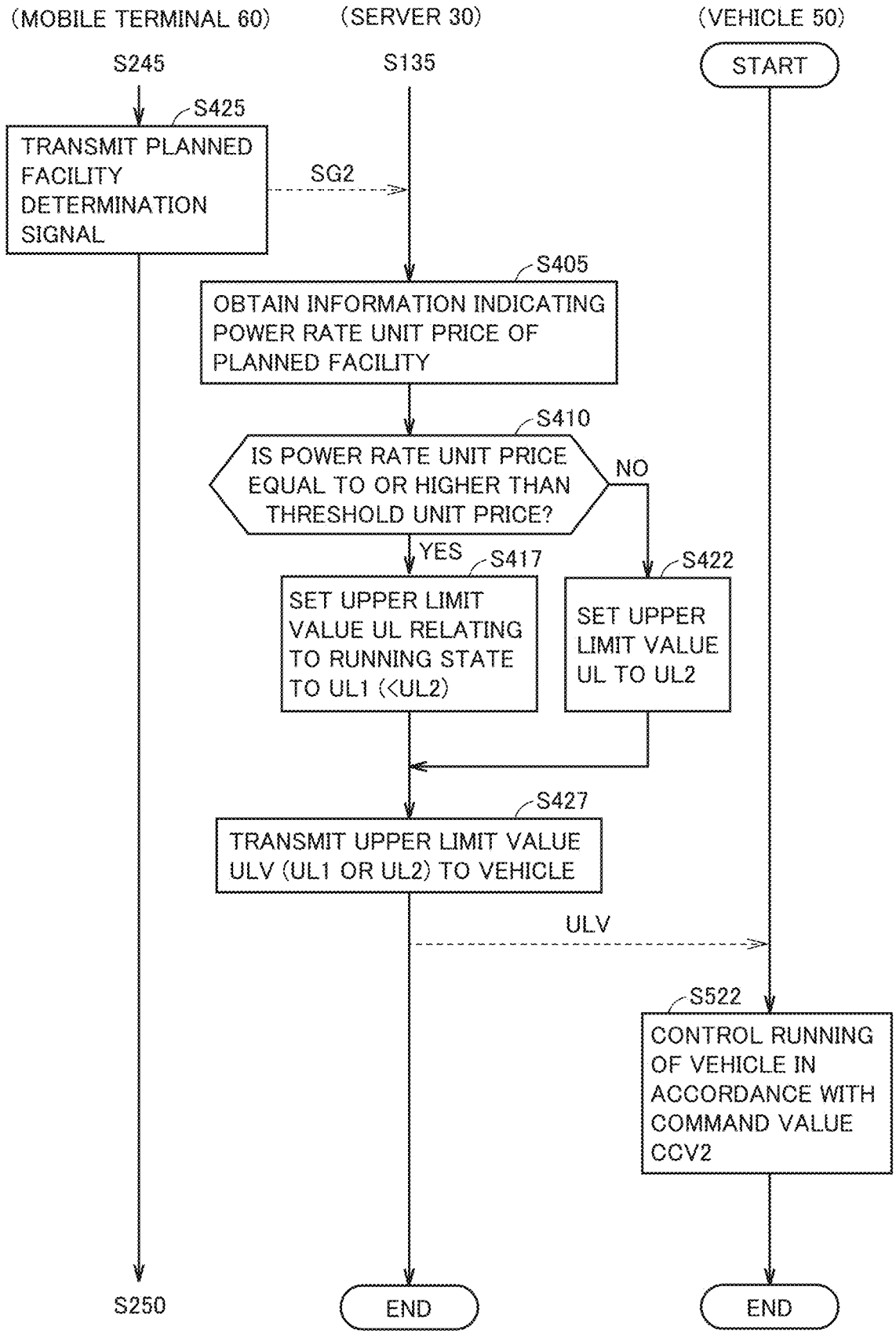
FIG. 18 is a flowchart illustrating a process performed by a server in a modification of the second embodiment.

FIG. 18 is a flowchart illustrating a process performed by server 30 in this modification. Referring to FIG. 18, this flowchart is different from the flowchart in the second embodiment (FIG. 17) in that S417, S422, S427, and S522 are performed instead of S415, S420, S425, and S520, respectively. The flowchart in FIG. 18 is otherwise identical to the flowchart in the second embodiment.

When the power rate unit price is equal to or higher than the threshold unit price (YES in S410), server 30 sets upper limit value ULV to UL1 (S417). UL1 is lower than UL2 that is a default speed upper limit or a default acceleration upper limit. (UL1<UL2). In contrast, when the power rate unit price is lower than the threshold unit price (NO in S410), server 30 sets upper limit value ULV to UL2 (S422). After S417 or S422, server 30 (communication device 310) transmits, to vehicle 50, upper limit value ULV determined based on which of these steps is performed (S427). Specifically, when S417 is performed, upper limit value ULV shows UL1. In contrast, when S422 is performed, upper limit value ULV shows UL2. After S427, the process of server 30 ends.

In response to the reception of upper limit value ULV, vehicle 50 (ECU 580) controls running of vehicle 50 in accordance with upper limit value ULV (S522). Specifically, ECU 580 controls MG 530 through PCU 520 to prevent the vehicle speed detected by vehicle speed sensor 542 from exceeding the speed upper limit, or to prevent the acceleration detected by acceleration sensor 543 from exceeding the acceleration upper limit. After S520, the process in FIG. 18 ends.

Other Modifications

The prescribed amount of charging may be an amount of electric power required to be supplied from power facility 25 to power storage device 500 in order to charge (supply) a prescribed amount of electric power (e.g., 10 kwh) to power storage device 500. The amount of electric power is stored in, for example, the memory of ECU 580.

Each of screens 710, 720, 730, 740, 750, 760, 770, 780, and 790 (FIGS. 9 and 10 to 16) may be displayed by display 549 of vehicle 50, instead of display 624 of mobile terminal 60. In this case, vehicle 50 corresponds to one example of "display device" in the present disclosure. In accordance with a control command CMV, controller 547 of vehicle 50 controls display 549 to display power-rate-related information 704 and placement position P of each of at least one power facility 25 on map image 708.

In the description above, vehicle 50 is used as one example of the movable object that can perform external charging. However, the movable object may be another type of electric movable object such as an electric motorcycle, an electric bicycle or an electric scooter.

The embodiments and the modifications thereof may be combined with each other as appropriate. For example, each of the second embodiment and the modification thereof may be combined with each of the first embodiment and the first to fourth modifications.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A display device comprising:
a display that displays a map image; and
a controller that controls the display, wherein
the controller controls the display to, when a placement position of at least one power facility is displayed on the map image, display power-rate-related information and the placement position of the at least one power facility on the map image,
the at least one power facility supplies electric power to an object having a power storage device mounted thereon, to charge the power storage device, the object being a movable object configured to move by consuming electric power of the power storage device,
the power-rate-related information is a predicted power rate to charge the power storage device of the movable object from a state-of-charge (SOC) of the power storage device at a start of charging estimated for the at least one power facility to a SOC of the power storage device at completion of charging, and
the controller receives the placement position and the predicted power rate for the at least one power facility from a server that:
obtains, from a first management server that manages the at least one power facility, information indicating a power rate unit price of the at least one power facility and the placement position information indicating the placement position of the at least one power facility,
obtain, from a second management server that manages the movable object, position information of the movable object, electric mileage information indicating electric mileage of the movable object, and SOC information indicating a present SOC of the power storage device,
estimates, for each of the at least one power facility, an SOC at the start of charging as an SOC when the movable object arrives at a corresponding power facility, in accordance with the placement position information of the corresponding power facility, the position information of the movable object, the electric mileage information of the movable object, and the SOC information indicating the present SOC of the power storage device, and
predicts, for each of the at least one power facility, the predicted power rate in accordance with the SOC at the completion of charging of the power storage device, the estimated SOC at the start of the charging, and the power rate unit price of the corresponding power facility.

2. The display device according to claim 1, wherein
the display device further comprises a communication device that receives data transmitted from a short-range communication device connected to a data link connector of the movable object, the data indicating completion of charging of the power storage device, and
when the contoller determines the completion of the charging in response to reception of the data by the communication device, the controller controls the display to display an actual value of the power rate.

3. The display device according to claim 1, wherein
the at least one power facility includes a first facility whose power rate unit price varies temporally.

4. The display device according to claim 3, wherein
the at least one power facility includes a plurality of power facilities, and
the plurality of power facilities further include a second facility whose power rate unit price is constant in time.

5. The display device according to claim 4, wherein
the controller controls the display to distinguish between the first facility and the second facility, and display the placement position and the power-rate-related information of the second facility and the placement position and the power-rate-related information of the first facility on the map image.

6. The display device according to claim 4, wherein
the controller controls the display to, when the power rate unit price of the first facility is lower than the power rate unit price of the second facility, display the placement position and the power-rate-related information of the first facility on the map image, without displaying the placement position and the power-rate-related information of the second facility on the map image.

7. The display device according to claim 4, wherein
the display device further comprises an input device that receives a user operation, the user operation including a first user operation and a second user operation different from the first user operation,
the controller
controls the display to display a first screen in response to the first user operation,
controls the display to display a second screen in response to the second user operation,
the first screen displays, on the map image, only the placement position and the power-rate-related information of the at least one first facility, of the placement positions and the power-rate-related information of the plurality of power facilities, and
the second screen displays, on the map image, only the placement position and the power-rate-related information of the at least one second facility, of the placement positions and the power-rate-related information of the plurality of power facilities.

8. The display device according to claim 1, wherein
the display device further comprises a communication device that receives a signal indicating a completion time of charging the power storage device from the at least one power facility, the controller determines a waiting time of the at least one power facility in accordance with the signal, and the controller controls the display to further display the waiting time on the map image.

9. The display device according to claim 1, wherein the at least one power facility includes a less-frequently-used facility as a power facility whose use frequency is lower than a threshold value, when the power storage device is charged by the less-frequently-used facility, an incentive is given to a user of the movable object, and the controller controls the display to display a degree of the incentive of the less-frequently-used facility on the map image, together with the power-rate-related information and the placement position of the less-frequently-used facility.

10. A display device comprising:

a display that displays a map image; and a controller that controls the display, wherein the controller controls the display to, when a placement position of at least one power facility is displayed on the map image, display power-rate-related information and the placement position of the at least one power facility on the map image, the at least one power facility supplies electric power to an object having a power storage device mounted thereon, to charge the power storage device, the power-rate-related information is information related to a power rate unit price for charging, the at least one power facility includes a plurality of power facilities, the plurality of power facilities include a minimum unit price facility as a power facility whose power rate unit price is minimum, of the plurality of power facilities, and a non-minimum unit price facility as a power facility different from the minimum unit price facility, and the controller controls the display to distinguish between the non-minimum unit price facility and the minimum unit price facility, and display the placement position and the power-rate-related information of the non-minimum unit price facility and the placement position and the power-rate-related information of the minimum unit price facility on the map image.

11. A server that communicates with a display device that displays a placement position of at least one power facility on a map image, the at least one power facility supplying electric power to an object having a power storage device mounted thereon, to charge the power storage device, the object being a movable object that moves by consuming electric power of the power storage device, the server comprising:

a communication device that obtains, from a first management server that manages the at least one power facility, information indicating a power rate unit price of the at least one power facility and placement position information indicating the placement position of the at least one power facility; and a processor that sets power-rate-related information of the at least one power facility in accordance with the power rate unit price, wherein the power-rate-related information is information related to the power rate unit price and indicating a power rate predicted as a power rate required from start to completion of charging of the power storage device, the communication device obtains, from a second management server that manages the movable object, position information of the movable object, electric mileage information indicating electric mileage of the movable object, and state-of-charge (SOC) information indicating a present SOC of the power storage device, the processor estimates, for each of the at least one ower facility, an SOC at the start of charging as an SOC when the movable object arrives at a corresponding power facility, in accordance with the placement position information of the corresponding power facility, the position information of the movable object, the electric mileage information of the movable object, and the SOC information indicating the present SOC of the power storage device, the processor predicts, for each of the at least one power facility, the power rate in accordance with an SOC at the completion of charging of the power storage device, the estimated SOC at the start of the charging, and the power rate unit price of the corresponding power facility, and the communication device transmits information indicating the predicted power rate as the power-rate-related information to the display device.

12. The server according to claim 11, wherein the movable object is a vehicle, the vehicle includes an electric device that operates by consuming electric power of the power storage device, the communication device communicates with the vehicle, when a planned facility planned to be used to charge the power storage device, of the at least one power facility, is determined, the processor performs a first setting process for setting a command value for an amount of power consumption in the electric device before charging of the power storage device, the first setting process includes setting the command value to a first value when the power rate unit price of the planned facility is equal to or higher than a threshold, and setting the command value to a second value higher than the first when the power rate unit price of the planned facility is lower than the threshold, and the communication device transmits the command value to the vehicle.

13. The server according to claim 11, wherein the movable object is a vehicle, the communication device communicates with the vehicle, when a planned facility planned to be used to charge the power storage device, of the at least one power facility, is determined, the processor performs a second setting process for setting an upper limit value relating to a running state of the vehicle, the second setting process includes setting the upper limit value to a first value when the power rate unit price of the planned facility is equal to or higher than a threshold, and setting the upper limit value to a second value higher than the first value when the power rate unit price of the planned facility is lower than the threshold, the upper limit value is an upper limit value of a running speed of the vehicle or an upper limit value of a running acceleration of the vehicle, and the communication device transmits the upper limit value to the vehicle.

14. A method for controlling a display device that displays a map image, the method executed by a processor and comprising:

obtaining, from a first management server that manages at least one power facility, information indicating a power rate unit price of the at least one power facility and placement position information indicating a placement position of the at least one power facility;

obtaining, from a second management server that manages a moveable object having a power storage device mounted thereon, position information of the movable object, electric mileage information indicating electric mileage of the movable object, and state-of-charge (SOC) information indicating a present SOC of the power storage device, the at least one power facility being configured to supply electric power to the movable object to charge the power storage device, the movable object being configured to move by consuming electric power of the power storage device;

estimating, for each of the at least one power facility, an SOC at a start of charging as an SOC when the movable object arrives at a corresponding power facility, in accordance with the placement position information of the corresponding power facility, the position information of the movable object, the electric mileage information of the movable object, and the SOC information indicating the present SOC of the power storage device;

predicting, for each of the at least one power facility, a power rate required from the start to completion of charging of the power storage device in accordance with an SOC at the completion of charging of the power storage device, the estimated SOC at the start of the charging, and the power rate unit price of the corresponding power facility; and controlling the display device to, when the placement position of the least one power facility is displayed on the map image, display the predicted power rate and the placement position of the at least one power facility on the map image.

* * * * *